US007315651B2

(12) United States Patent
Sakuyama et al.

(10) Patent No.: US 7,315,651 B2
(45) Date of Patent: Jan. 1, 2008

(54) IMAGE RECORDING APPARATUS AND IMAGE DATA SELECTION METHOD

(75) Inventors: Hiroyuki Sakuyama, Tokyo (JP); Akira Takahashi, Kanagawa (JP); Takao Inoue, Kanagawa (JP); Takanori Yano, Kanagawa (JP); Takashi Maki, Kanagawa (JP); Keiichi Ikebe, Kanagawa (JP); Taku Kodama, Kanagawa (JP); Ikuko Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 912 days.

(21) Appl. No.: 10/623,558

(22) Filed: Jul. 22, 2003

(65) Prior Publication Data
US 2004/0136595 A1    Jul. 15, 2004

(30) Foreign Application Priority Data
Jul. 23, 2002   (JP) ............................. 2002-213560
Jul. 17, 2003   (JP) ............................. 2003-198587

(51) Int. Cl.
*G06K 9/36* (2006.01)

(52) U.S. Cl. ...................... 382/232; 382/233; 382/224; 382/240

(58) Field of Classification Search ................ 382/232, 382/233, 240, 224, 190, 195, 305; 358/1.15, 358/1.1; 370/238, 466; 709/228, 230; 715/716, 715/727; 707/3, 104.1; 380/252; 348/E7.061
See application file for complete search history.

(56) References Cited

U.S. PATENT DOCUMENTS

| 5,557,797 | A | 9/1996 | Yano ........................... 717/124 |
|---|---|---|---|
| 5,902,968 | A | 5/1999 | Sato et al. ............... 178/19.01 |
| 5,981,884 | A | 11/1999 | Sato et al. ............... 178/19.01 |
| 6,084,577 | A | 7/2000 | Sato et al. .................. 345/179 |
| 6,104,327 | A | 8/2000 | Maki .......................... 341/101 |
| 6,137,595 | A | 10/2000 | Sakuyama et al. ........... 358/1.9 |
| 6,226,011 | B1 | 5/2001 | Sakuyama et al. .......... 345/600 |
| 6,229,102 | B1 | 5/2001 | Sato et al. ............... 178/19.01 |
| 6,263,106 | B1 | 7/2001 | Yamagata ................... 382/232 |
| 6,327,392 | B1 | 12/2001 | Li ............................... 382/248 |
| 6,370,667 | B1 | 4/2002 | Maki .......................... 714/758 |
| 6,400,766 | B1 | 6/2002 | Lafe ...................... 375/240.21 |
| 6,421,042 | B1 | 7/2002 | Omura et al. ............... 345/157 |
| 6,421,134 | B1 * | 7/2002 | Kuroshima et al. ........ 358/1.15 |
| 6,518,960 | B2 | 2/2003 | Omura et al. ............... 345/173 |
| 6,654,135 | B2 * | 11/2003 | Mitani ....................... 358/1.15 |
| 6,665,442 | B2 * | 12/2003 | Sekiguchi et al. .......... 382/224 |

(Continued)

FOREIGN PATENT DOCUMENTS

EP         1 102 490         5/2001

(Continued)

*Primary Examiner*—Anh Hong Do
(74) *Attorney, Agent, or Firm*—Oblon, Spivak, McClelland, Maier & Neustadt, P.C.

(57) ABSTRACT

An image recording apparatus includes means for recording image data in a recording medium; means for obtaining information for determining a data amount reduction remaining force of image data recorded in the recording medium; means for selecting image data determined to have a large data amount reduction remaining force based on the information obtained by the means for obtaining information, with a priority; and means for performing a data amount reduction process against the image data selected by the means for selecting.

48 Claims, 15 Drawing Sheets

U.S. PATENT DOCUMENTS

| | | | |
|---|---|---|---|
| 2001/0050875 A1 | 12/2001 | Kahn et al. | 365/229 |
| 2002/0159644 A1 | 10/2002 | Sakuyama | |

FOREIGN PATENT DOCUMENTS

| | | | |
|---|---|---|---|
| JP | 8-9312 | | 1/1996 |
| JP | 11-167770 | | 6/1999 |
| JP | 2000-69421 | | 3/2000 |
| JP | 2000101809 | * | 4/2000 |
| JP | 2001-128043 | | 5/2001 |
| JP | 2001-218062 | | 8/2001 |
| JP | 2001-231009 | | 8/2001 |
| JP | 2001-309138 | | 11/2001 |
| JP | 2001-320588 | | 11/2001 |
| JP | 3229144 | | 11/2001 |
| JP | 2002-44601 | | 2/2002 |
| JP | 2002-125230 | | 4/2002 |
| JP | 2002-185911 | | 6/2002 |

* cited by examiner

| Parameter | Size (bits) | Values |
|---|---|---|
| QCD | 16 | 0xFF5C |
| Lqcd | 16 | 4 — 197 |
| Sqcd | 8 | FIG. 12 |
| $SPqcd^i$ | variable | FIG. 12 |

FIG.12

| Values (bits) MSB    LSB | Quantization style | SPqcd or SPqcc size (bits) | SPqcd or SPqcc usage |
|---|---|---|---|
| xxx0 0000 | No quantization | 8 | FIG.13 |
| xxx0 0001 | Scalar derived (values signalled for $N_L LL$ subband only). Use Equation E.5. | 16 | FIG.14 |
| xxx0 0010 | Scalar expounded (values signalled for each subband). There are as many step sizes signalled as there are subbands. | 16 | FIG.14 |
| 000x xxxx — 111x xxxx | Number of guard bits 0 — 7 | | |
| | All other values reserved | | |

FIG.13

| Values (bits) MSB — LSB | Reversible step size values |
|---|---|
| 0000 0xxx — 1111 1xxx | Exponent $\xi_b$, of the reversible dynamic range signalled for each subband |
| | All other values reserved |

FIG.14

| Values (bits) MSB — LSB | Quantization step size values | |
|---|---|---|
| xxxx x000 0000 0000 — xxxx x111 1111 1111 | Mantissa, $\mu_b$, of the quantization step size value | |
| 0000 0xxx xxxx xxxx — 1111 1xxx xxxx xxxx | Exponent, $\varepsilon_b$, of the quantization step size value | |

IMAGE RECORDING APPARATUS AND IMAGE DATA SELECTION METHOD

BACKGROUND OF THE INVENTION

1. Field of the Invention

The present invention generally relates to an image recording apparatus such as an electronic camera for recording image data to a recording medium, and more particularly, a technology for securing unused capacity of the recording medium of the image recording apparatus.

2. Description of the Related Art

Generally in a case where an electronic camera apparatus such as a digital still camera is short of an unused capacity of a recording medium, image data that are recorded to the recording medium are erased so as to secure additional unused capacity of a recording medium. Erasing the image data can be performed by selecting individual pieces of the image data or selecting all of the image data. However, in a case of selecting individual pieces of the image data, the procedure is complicated. In a case of selecting all of the image data, although the procedure is not complicated, there is a disadvantage in that some image data desired to be retained cannot be stored.

In order to erase the image data that are recorded more efficiently and store the image data desired to be stored, the following technology is described in Japanese Laid-Open Patent Application, No. 2002-44601. That is, image data consisting of correlated image data such as image data taken consecutively, image data blanket-photographed, and image data panorama-photographed, are managed as a group. Furthermore, image data desired to be stored are protect-designated. Because of this, if image data belonging to a group are selected and ordered to be erased, other image data belonging to the same group, except image data that are protect-designated, are erased together.

Alternatively, there is another technology wherein image data that are recorded are not erased but the amount of the image data is reduced so that additional unused capacity of the recording medium is secured.

For example, Japanese Laid-Open Patent Application No. 8-9312 discloses a technology wherein selected image data are recompressed at a higher compression ratio, or a part of the image data is trimmed so that the amount of data is reduced. Japanese Laid-Open Patent Application No. 2001-320588 discloses a technology wherein a coded method having a multiple layer structure is applied and code data are reduced at a layer unit so that the amount of the image data is reduced. Japanese Laid-Open Patent Application No. 2001-231009 discloses image data that are recorded are recompressed and codes of a part of the code data are deleted so that the amount of the data is reduced and additional unused capacity corresponding to deleted pieces of recording image can be secured. In this technology, furthermore, the compression ratio of new image data is controlled so as to correspond to the additional unused capacity secured by reducing the amount of the data.

Japanese Patent No. 3229144 discloses a technology regarding control of the compression ratio of new image data wherein the control is automatically switched to an intermediate precision mode having a higher compression ratio when there is a lack of the unused capacity at a high precision mode.

Japanese Laid-Open Patent Application No. 2001-218062 discloses a technology of a system for managing a radiation image wherein the amount of data is reduced by a combination of deletion of a code in a non-interest area of image data that are stored, and recompression. In addition, Japanese Laid-Open Patent Application No. 2001-309138 discloses a technology of a copying machine in that color image data are transformed to black-and white image data so that the amount of the data is reduced.

A method wherein the amount of image data that is recorded is reduced so that additional unused capacity of the recording medium can be secured has an advantage as compared with a method for erasing image data in that image data desired to be stored are not erased completely. However, the selection of image data to have the recorded amount reduced depends on the user. The Japanese Patent Laid-Open Patent Application No. 2001-231009 merely discloses selecting image data having a maximum amount of recorded data.

SUMMARY OF THE INVENTION

Accordingly, it is a general object of the present invention to provide a novel and useful image recording apparatus and an image data selection method in which one or more of the problems described above are eliminated.

Another and more specific object of the present invention is to provide an image recording apparatus such as an electronic camera apparatus whereby image data are selected more rationally and the amount of data can be reduced without troubling the user (photographer) so as to obtain satisfaction of the user.

The most important thing regarding automatic performance of a process of data amount reduction of image data that are recorded is whether or not the user (photographer) can accept deterioration of image quality. Hence, in order to obtain high satisfaction of the user (photographer), it is preferable that image data on which a data amount reduction process is performed can be selected with consideration of image quality. Furthermore, it is important for obtaining the high satisfaction of the user (photographer) to reflect use's (photographer's) will or taste.

The above objects of the present invention are achieved by an image recording apparatus, including: means for recording image data in a recording medium; means for obtaining information for determining a data amount reduction remaining force of image data recorded in the recording medium; means for selecting image data determined to have a large data amount reduction remaining force based on the information obtained by the means for obtaining information, with a priority; and means for performing a data amount reduction process against the image data selected by the means for selecting.

The above objects of the present invention are also achieved by an image data selection method for selecting image data on which a data amount reduction process is performed from image data recorded in a recording medium, comprising the steps of: a) obtaining information for determining a data amount reduction remaining force of image data; and b) selecting image data determined to have a large data amount reduction remaining force, based on the information obtained in the step a), by a criterion, with a priority.

Other objects, features, and advantages of the present invention will become more apparent from the following detailed description when read in conjunction with the accompanying drawings.

BRIEF DESCRIPTION OF THE DRAWINGS

FIG. 12 shows quantization default values for the Sqcd and Sqcc parameters;

FIG. 13 shows reversible step size values for the SPqcd and SPqcc parameters (reversible transform only);

FIG. 14 shows quantization values for the SPqcd and SPqcc parameters (irreversible transformation only);

DETAILED DESCRIPTION OF THE PREFERRED EMBODIMENTS

A description is given below, with reference to the drawings, of embodiments of the present invention.

Figure 1:
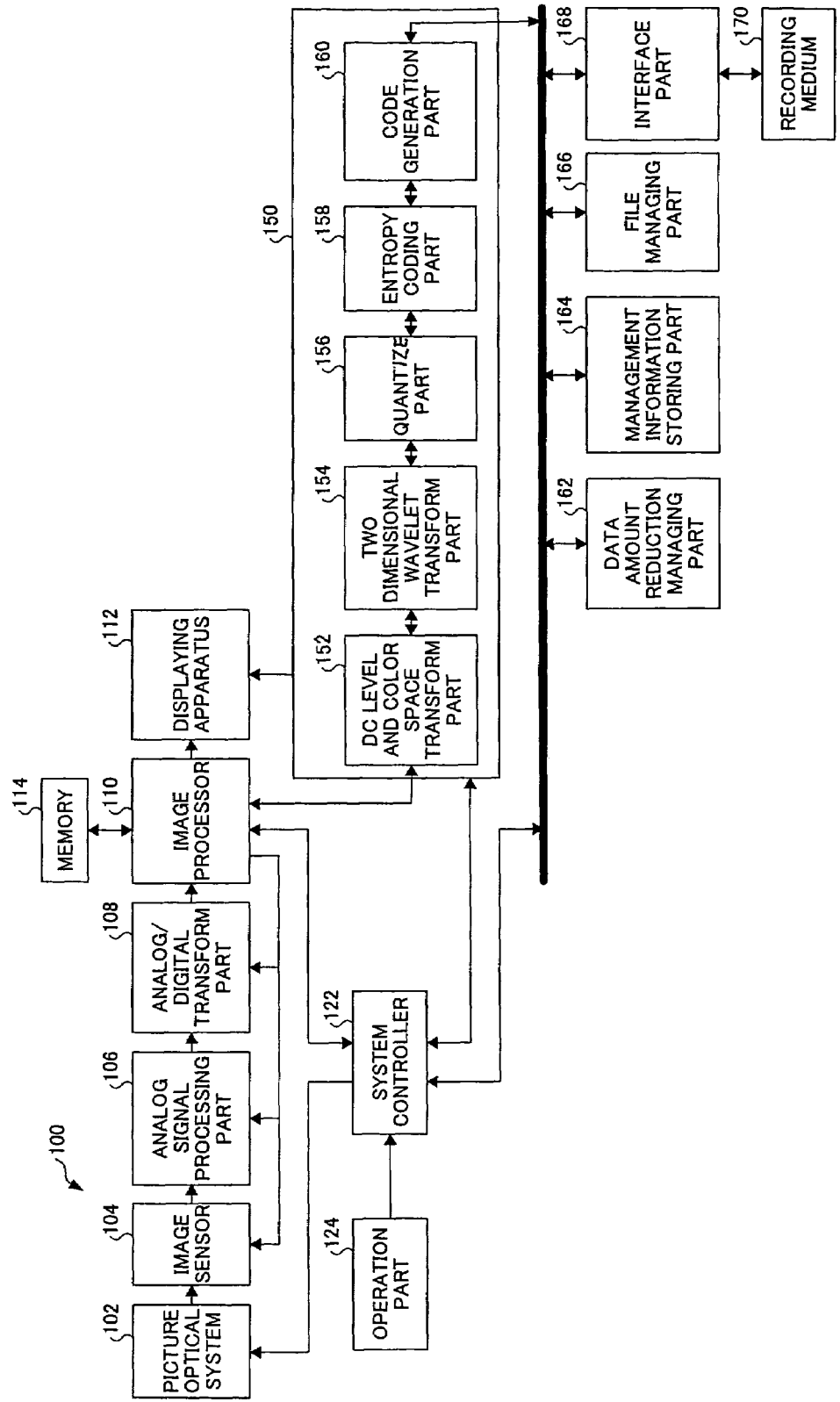
FIG. 1 is a block diagram for explaining an embodiment of the present invention.

FIG. 1 is a block diagram for explaining an embodiment of the present invention. In this embodiment, an electronic camera, by which a still picture and a motion picture of a subject to be photographed is taken with picture means, a frame picture image of the still picture and the motion picture is input, and image data of the frame picture image are recorded to a recording medium, is used. Although a so called digital still camera whose main function is taking the still picture is explained as the electronic camera in this specification, the inventor of the present invention does not have any intention to exclude a so called digital video camera whose main function is taking the motion pictures. The present invention can be applied to the entire image recording apparatus by which image data of a still picture or a motion picture is input from an apparatus such as a personal computer or an optical disk apparatus, a network, or the like, and recorded to a recording medium. Furthermore, an image data selection method of the present invention is described in this embodiment.

Referring to FIG. 1, picture means 100 (more specifically image input means) include a picture optical system 102, an image sensor 104, an analog signal processing part 106, an analog/digital transform part 108, an image processor 110, a memory 114, a displaying apparatus 112, an operation part 124, and a system controller 122. An optical image of a subject to be photographed is formed at the image sensor 104 by the picture optical system 102 so as to be transformed into an electric signal. The picture optical system 102 includes an optical lens, an iris mechanism, a shutter mechanism, and the like. The image sensor 104 performs a color separation of the formed optical image by a color filter and outputs an image signal corresponding to the amount of light of respective color components. Generally, a CCD type image sensor or a MOS type image sensor is used as the image sensor 104.

The image signal output from the image sensor 104 is treated by a process of correlated double sampling, gamma correction, white balance adjustment, and the like by the analog signal processing part 106, and then transformed to digital image data by the analog/digital transform part 108 so as to be input to the image processor 110. The image processor 110 performs imaging processing such as an edge enhancement process on image data, controls the image sensor 104, the analog signal processing part 106, the analog/digital transform part 108, and the displaying apparatus 112, and detects information for auto focus control, automatic exposure control, and the like. The image processor 110 includes the memory 114 for temporarily storing image data having more than one frame. The displaying apparatus 112 is a liquid crystal displaying apparatus, for example. The displaying apparatus 112 is used for displaying a photographed image (a through image) at the time of monitoring, a recording image, and various kinds of information. The processes such as gamma correction and the white balance adjustment may be treated by the image processor 110 as a modified embodiment. This modified embodiment is included in the present invention.

A system controller 122 responds to operation information input from an operation part 124 and information given by the image processor 110, and performs control regarding the picture means 100 such as control of the shutter mechanism, the iris mechanism, and the zooming mechanism of the picture optical means 102 and control of the image processor 110. In addition, the system controller 122, as described below, performs a control regarding compression/elongation and recording/reading out of the image data, reduction of the amount of recorded image data, and the like.

The image data photographed (input) by the picture means 100 is compressed and then recorded to a recording medium 170 such as a memory card, as an image file having a designated file format. An image compression/elongation part 150 is provided for compressing and elongating such image data. A file managing part 166 is provided for recording the compressed image data to the recording medium 170 and reading out the recorded image data. Recording or reading out the image file is performed via an interface part 168 based on control of the file managing part. Furthermore, in the present invention, a reduction process of the amount of the recorded image data is performed. A data amount reduction managing part 162 is provided for managing the above mentioned process and selecting image data that are subject to be processed. A management information storing part 164 is provided for storing information related to the reduction process of the amount of the data and recording/reading out process of the image file. The entire operation related to the compression/elongation of the image data, recording/reading out the image data, and data amount reduction of the recorded image data is controlled by the system controller 122.

Although it is preferable for the image compression/elongation part 150 to have a structure wherein an image compression algorithm by which the amount of data can be adjusted with an operation of code data and without recompression of image data is used, an image compression algorithm requiring recompression may be used. In this embodiment, the image compression/elongation part 150 has a structure wherein an image compression algorithm in conformity to JPEG2000 is used. The image compression/elongation part 150 includes a DC level and color space transform part 152, a two dimensional wavelet transform part 154, a quantize part 156, an entropy coding part 158, and a code generation part 160.

An operation for standardizing a basic form (JPEG2000 Part 1) of JPEG2000 was completed so that JPEG2000 was recommended in January 2001. A recommendation of Motion JPEG2000 (JPEG2000 Part 3) that is an expanded form of JPEG2000 is close at hand. The Motion JPEG2000 handles a motion picture as a series of still pictures. A compression algorithm of the Motion JPEG2000 for respective frame images is the same as the basic form of JPEG2000. The difference between the basic form of JPEG2000 and the Motion JPEG2000 is only a partial difference of file format. Details of the image compression algorithm of the JPEG2000 are, for example, described in a publication "Next generation image code method JPEG2000" written by Nomizu Tadayuki and published by Triceps. A schematic explanation thereof as follows.

Image data that are subjects of a compression process, respective image data in a case where the motion picture is handled, are divided into non-overlapped rectangular areas called tiles for every component, so that the image data are input into the DC level and color space transform part 152.

In order to improve the compression ratio, a level shift operation and a color space transform process are performed at the DC level and color space transform part 152. The level shift operation is an operation for subtracting a half of the dynamic range from an integer value not having a code such as an RGB value. In a case where the input image data are YCrCb data, for example, the level shift operation is not performed against an integer value having a code such as a Cr or Cb component. The color space transform process is a process for transforming YCrCb data in a case where the input image data are RGB data or CMY data. The DC level transform and the color space transform may be performed by the image processor 110.

After being processed by the DC level and color space transform part 152, the image data of the respective tiles of the respective components are processed by a two-dimensional wavelet transform (Discrete Wavelet Transform: DWT) by the two-dimensional wavelet transform part 154.

Figure 2:
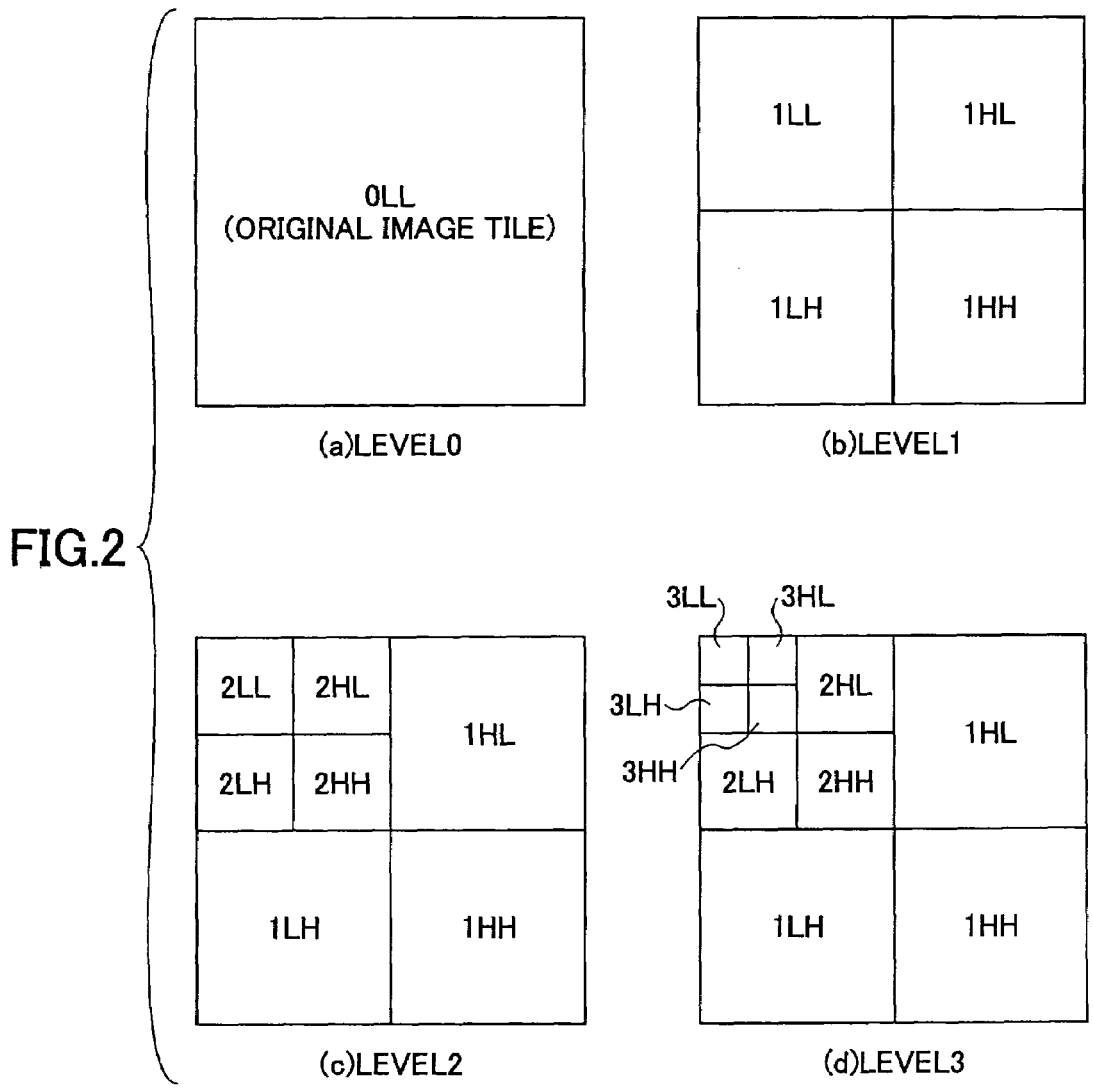
FIG. 2 is a view for explaining two-dimensional wavelet transform.

FIG. 2 is a view for explaining a two-dimensional wavelet transform in a case where the decomposition level number is 3 (three). By performing the two-dimensional wavelet transform on a tile image 0LL shown in FIG. 2-(a), the tile image is divided into respective sub-bands of 1LL, 1HL, 1LH and 1HH as shown in FIG. 2-(b). By applying the two-dimensional wavelet transform to the coefficient of 1LL sub-band coefficients, 1LL is divided into sub-bands of 2LL, 2HL, 2LH, and 2HH as shown in FIG. 2-(c). By applying the two-dimensional wavelet transform to the coefficient of 2LL sub-band coefficients, 2LL is divided into sub-bands of 3LL, 3HL, 3LH, and 3HH as shown in FIG. 2-(d).

Coefficients of the respective sub-bands, obtained by a recursive division (octave division) of such low frequency components (LL sub-band coefficients), are quantized by the quantize part 156 and then coded by the entropy coding part 158. JPEG2000 can perform a reversible compression (lossless compression) and irreversible compression (lossy compression). In the case of the reversible compression, the quantizing step width is always 1 (one) and quantizing is not substantially performed in this stage.

The entropy coding part 158 performs entropy coding of the wavelet coefficients. For the entropy coding, a bitplane code method based on a block, called EBCOT (Embedded Block Coding with Optimized Truncation) is used. EBCOT consists of a block division, coefficient modeling, and binary algebraic coding. The wavelet coefficient that is subject to coding is an integer having a positive code or a negative code. The wavelet coefficients are scanned in a designated order, and a coding process is performed on the wavelet coefficients whose coefficients are expressed as an absolute values, from an upper bit to a lower bit for every bitplane unit.

A code line generated by the entropy coding part 158 is sent to the code generation part 160. The code line that is algebraically-coded is arranged so as to reform in order required at the end, and a part of the codes are deleted (post-quantized) if necessary so that one bit stream is output.

Figure 3:
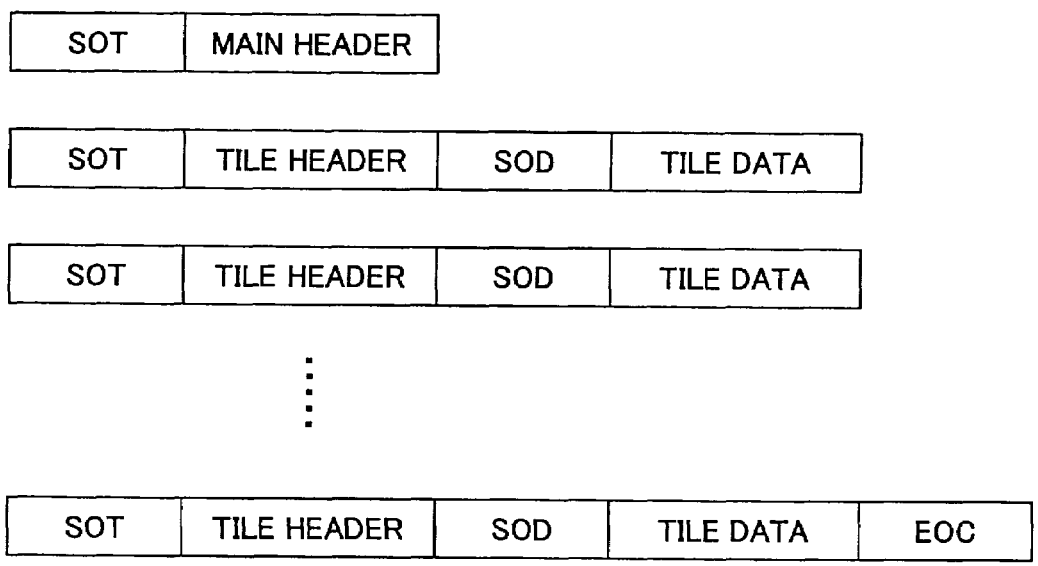
FIG. 3 is a view for explaining a code data structure created by an image compression/elongation part.

Code data (compression data) output by the image compression/elongation part 150 has a structure shown in FIG. 3.

As shown in FIG. 3, in the code data, a SOC marker starts is first, a main header follows and then data of all respective tiles follow. In the main header, a parameter of coding, a parameter of quantizing, or the like is described. In the data of the respective tiles, a SOT marker is first. The data of the respective tiles include a tile header, a SOD marker, and tile data (code line). After the last tile data, an EOC marker representing the ending is provided.

The image compression algorithm of JPEG2000 produces high quality images at a high compression ratio (low bit rate) and has a lot of favorable characteristics. One example of the characteristics of JPEG2000 is quantizing (post-quantizing) based on deletion (truncation) of a code of the lower bitplane after coding is performed. Because of this, the amount of all of codes, namely the compression ratio, can be adjusted without recompressing. In JPEG2000, the bitplanes of the coefficients are put in order using code block units or precinct units so as to form a layer comprising any number of bitplanes. In a case where a plural layer structure is applied, it is possible to perform to post-quantizing with a layer unit from the lower layer.

An elongation process of the code data is an opposite process to the compression process of the code data. Tag information of the code data is implemented by the code generation part 160. The code data are analyzed into code lines of the respective tiles of the respective components. This code line is decoded to a wavelet coefficients in order based on the tag information by the entropy coding part 158. The wavelet coefficients that are decoded are treated reverse-quantized by the quantize part 156, and then subjected to two-dimensional wavelet reverse-transform by the two-dimensional wavelet transform part 154. As a result of this, images of the respective tiles of the respective components are reproduced. The respective tile images of the respective components are subjected to transform process opposite to the process at the time of compression by the DC level and color space transform part 152, and then output. The respective tile images of the respective components are combined by the image processor 110 so that the compressed image can be reconstructed.

Figure 9:
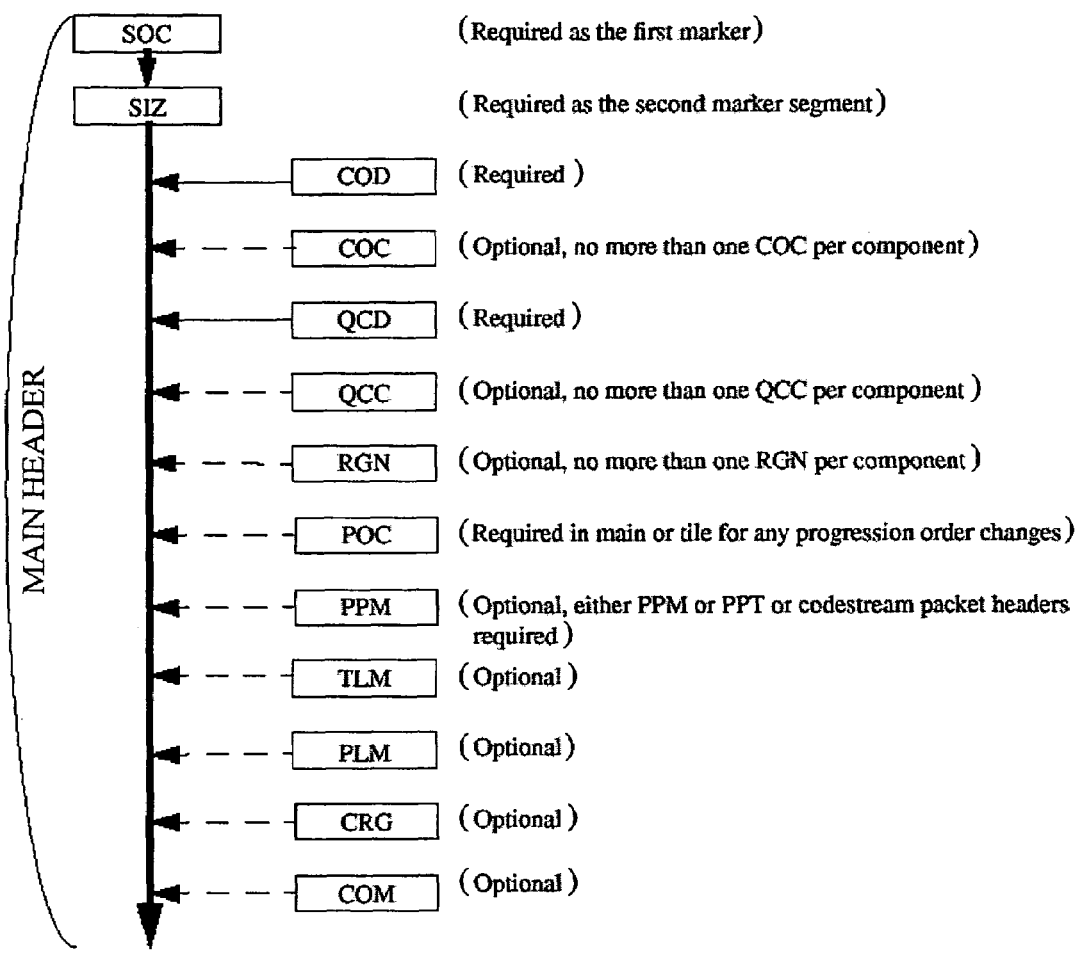
FIG. 9 shows contents of a main header shown in FIG. 3 handled by the embodiment of the present invention.

Since JPEG2000 adopts a bitplane coding, an encoder has to estimate the maximum value of wavelet coefficients and translate the maximum value into the maximum number of bitplanes which have to be coded. This maximum number of bitplanes can be read from the codestreams as follows:

FIG. 9 shows the contents of the main header shown in FIG. 3, which contains a QCD and a QCC, according to JPEG2000.

Figures 10, 11:
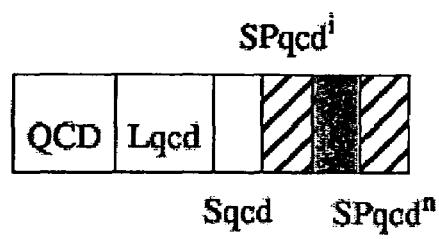
FIG. 10 shows a configuration of a QCD marker shown in FIG. 9.
FIG. 11 shows quantization default parameter values of QCD marker segment shown in FIG. 10.

The construction of a QCD marker segment is shown in FIG. 10, and 'eb' and a guard bit can be read from an SPqcd. In this regard, also see FIGS. 11-14.

When an image contains multi-components and the codestream has a QCC marker segment, 'eb' corresponding to each component can be read from an SPqcc in the QCC marker.

Along the transformation, a wavelet transform increases the bits of coefficients and the amount of increased bits are different among HL, LH, and HH subbands according to JPEG2000. In the increased bits, the common amount of bits for each subband is treated as a guard bit, and the difference among the subbands are called "gain bits" for the convenience here. The amount of "gain bits" are independent of decomposition level (how many wavelet transform processes are done) and are specified in the standard as 0, 1, 1, 2 for LL, HL, LH, HH, respectively.

'eb' is calculated during encoding, and when 5×3 wavelet is applied, it is given by the following equation:

(bits of original image)+(gain bits)+(increased bits by component transform)

=Rb+(increased bits by component transform)

It should be noted that the reversible component transform increases the bits like wavelet transform.

As for 9×7 wavelet, 'eb' (=εb) is given by the Δb (quantization step size) in the following equation and μb shown in FIG. 14:

$$\Delta b = 2^{Rb-\varepsilon b}\left(1 + \frac{\mu b}{2^{11}}\right)$$

Here again,

Rb=(bits of original image)+(gain bits)

As for 5×3, which does not adopt quantization, Δb is regarded as 1.

Using the equations shown above, the maximum number of bitplanes is given as follows, which is common between the 5×3 and 9×7 wavelet schemes:

(the maximum number of bitplanes)=(bits of original image)+(gain bits)+(increased bits by component transform)−(decreased bits by quantization−1)

=eb+guard bit−1        (Eq.MBP)

(−1 in the above equation is due to the DC level shift adopted in JPEG2000.)

Next, the definition of number of zero bitplanes, number of coded bitplanes, and how to read them form codestream will be shown.

Eq MBP above gives the maximum number of bitplanes in the subband, but it is natural that each codeblock in the subband does not always have the corresponding number of bitplanes (corresponding value of coefficients) to be coded. Some codeblocks have only zero values in most significant bitplanes, which should not be coded (in the same way as least significant bitplanes).

Then, for each codeblock, the number of zero bitplanes is defined as follows:

(the number of zero bitplanes)=(the number of maximum bitplanes)−(the number of actual bitplanes to be coded).

The number of zero bitplanes for each codeblock can be read from the packet header. The following figures show the construction of tile data which comprises packet data, and the packet data comprises packet header and packet data.

| INTERNAL CONFIGURATION OF TILE DATA | | | | |
|---|---|---|---|---|
| PACKET | PACKET | PACKET | PACKET | ... |

| INTERNAL CONFIGURATION OF EACH PACKET | |
|---|---|
| PACKET HEADER | PACKET DATA |

The packet header contains the following contents,

The packets have headers with the following information:
Zero length packet
Code block inclusion
Zero bit-plane information
Number of coding passes
Length of the code block compressed image data from a given code block which mean, respectively:
whether the packet is empty or not (whether the packet has no coded bitplanes or not);
how many codeblocks the packet contains;
the number of zero bitplanes for each codeblock included in this packet;
the number of coded subbitplanes (=coding passes) for each codeblock included and coded in this packet; and
the length of entropy code for each codeblock included and coded in this packet.

Then, the number of zero bitplanes for each codeblock is given by referring to the packet header. And using the above-mentioned Eq.MBP, the number of non-zero bitplanes for each codeblock is given. And referring to the packet header, the number of coded subbitplanes for each codeblock in the packet can be read directly, which can be translated into the number of coded bitplanes for each codeblock.

It is noted that when the codestream has multiple layers, one codeblock is coded in multiple layers. For example, when 9 bitplanes should be coded, it is possible that the packet in a layer A has 5 coded bitplanes and a layer B has 4 coded bitplanes, for example. When calculating the coded bitplanes for a codeblock, the number should be summed for all layers.

Usually, a subbitplane is an imaginary division of one bitplane, and one bitplane is divided into 3 subbitplanes for example. Most significant non-zero bitplane is not divided into subbitplanes exceptionally.

As for the definition of codeblock, packet, layer and subband gain, a description will now be made. A coding process in JPEG2000 is performed in the following sequence:
Wavelet transform of tile→Quantization of coefficient of each subband→Bitplane coding of each codeblock→Assemble the entropy code of each codeblock into packets→Generate codestream by arranging packets in desired order.

The last two steps are so called codestream generation process. In the process, packets (units of entropy coded code) are arranged in a desired order.

Figure 15:
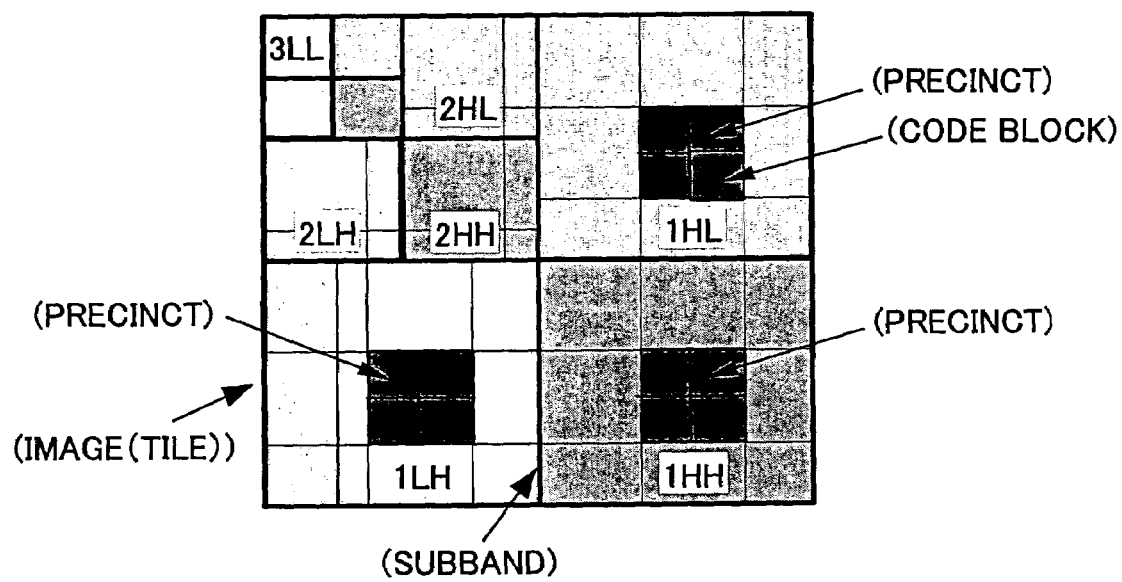
FIG. 15 illustrates terms according to JPEG2000.

The relation among image, tiles, subbands, precincts, codeblocks, packets, and layers are as follows (see FIG. 15). The order of dimension is as follows:

an image≧a tile>a subband≧a precinct≧a codeblock

Tiles are rectangular divisions of an image. If the number of division equals to one, a tile equals to an image.

Precincts are rectangular divisions of subbands and roughly express the position in the image. One unit of precinct is composed of 3 rectangular division in HL, LH, and HH subbands, whose positions in the tile are the same thereamong. Or one unit of precinct is composed of only 1 rectangular division in LL subband. A precinct can be as large as 3 (=HL, LH, HH) subbands (so called maximum precinct). And precincts are further divided into rectangular codeblocks.

A packet is a collection of a part of entropy code from each codeblock within one precinct. The above-mentioned "a part" can have some bitplanes (not all bitplanes), or the above-mentioned "a part" can have even no bitplane. When "a part" from each codeblock includes no bitplane, the packet is called "an empty packet".

A layer is a collection of packets from each precinct (for the entire tile). A layer is roughly a part of bitplanes for the entire tile, which mean units of the tile (image) quality.

Figure 16A:
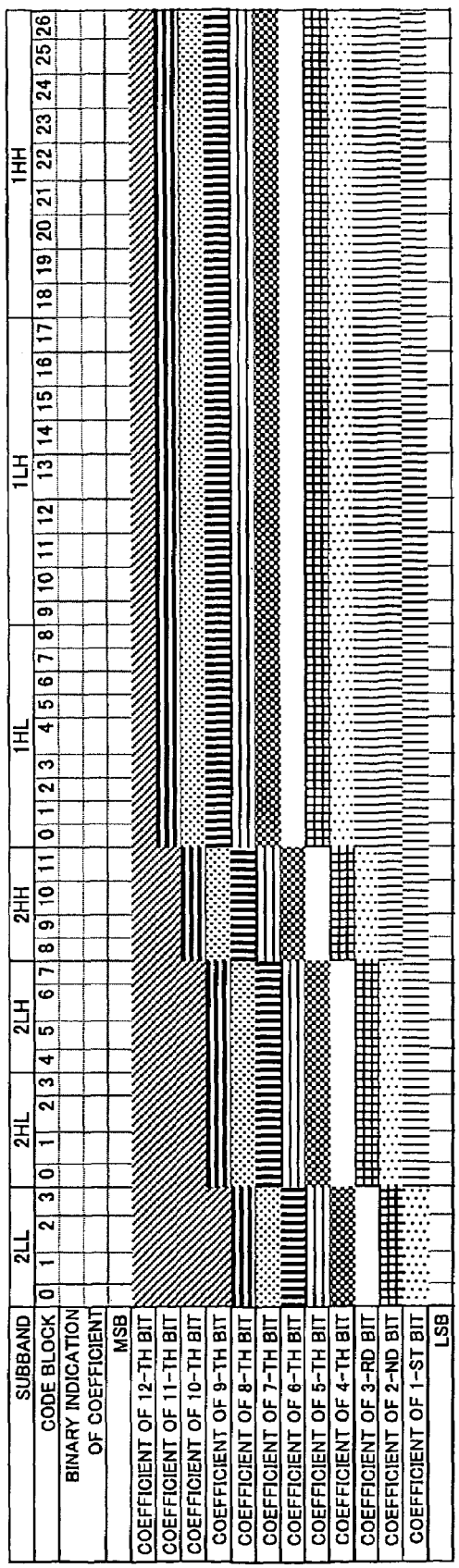
FIGS. 16A, 16B and 16C illustrate concepts of layer and packet in conjunction with a bitplane coding scheme according to JPEG2000.
Figure 16B:
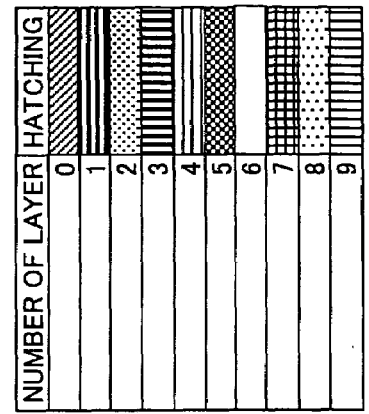
Figure 16C:
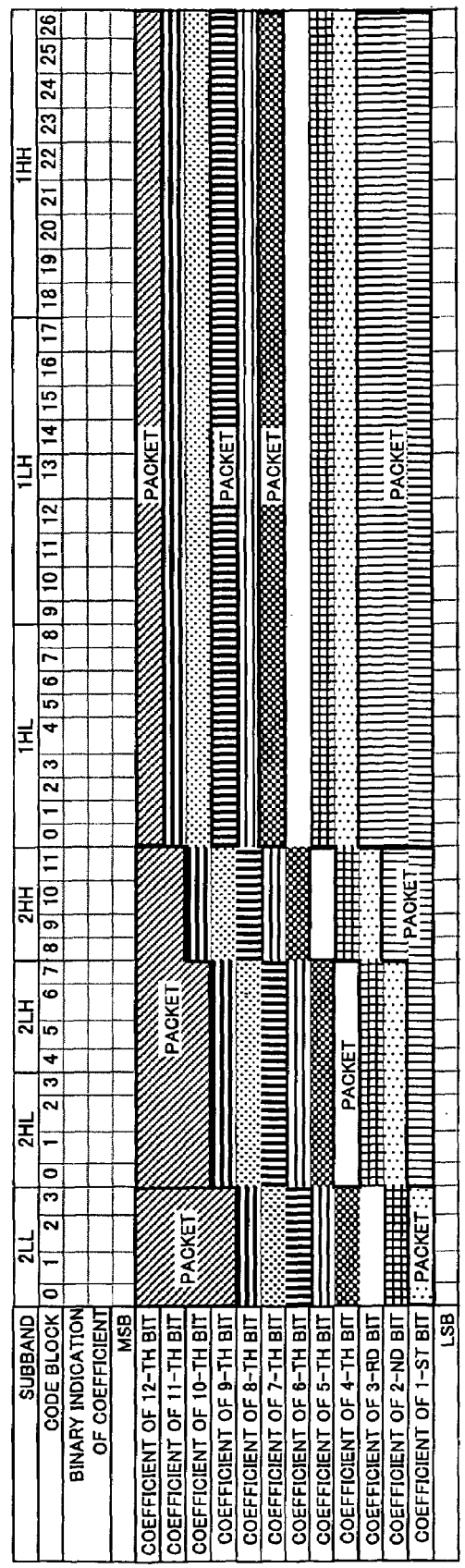

The collection of all layers forms the codestream for the entire tile. FIGS. 16A, 16B and 16C shows an example illustrating the layers and packets in case the number of decomposition levels (how many times wavelet transforms are done) is 2, and the maximum precinct is used. Since a packet is a collection throughout the precinct, when the maximum precinct is used, the packet is a collection throughout the HL, LH, and HH subbands Some packets are enclosed in bold lines as shown in FIGS. 16A, 16B and 16C.

Accordingly, even after the codestream generation, the above-mentioned post-quantization can be done by discarding some layers (in case the codestream has multiple layers), or some packets. Or it is possible to discard the entropy code of some bitplanes included in the packet and generate a packet header again.

A subband gain will now be described. During a decoding, an inverse wavelet transform is applied, and, there, the "magnification" between a wavelet coefficient and a pixel value is different for each subband. The square of this "magnification" is called a subband gain (Gsb). During the inverse transform, a quantization error $\Delta e$ is multiplied by $\sqrt{Gsb}$.

A subband gain can be calculated bellow for 5×3 wavelet transform, as an example:

An inverse transform of 5×3 wavelet is done on interleaved coefficients. First, inverse lowpass filter is applied horizontally (i.e., along the x axis) on even coefficients C(2i), and P(2i) is calculated. A second inverse highpass filter is applied horizontally on odd coefficients C(2i+1), and P(2i+1) is calculated. These processes are done for each vertical line (i.e., y coordinate). Here, inverse filters are defined as follows:

$$P(2i)=C(2i)-\lfloor (C(2i-1)+C(2i+1)+2)/4 \rfloor \qquad \text{Eq.3}$$

$$P(2i+1)=C(2i+1)+\lfloor (P(2i)+P(2i+2))/2 \rfloor \qquad \text{Eq.4}$$

Removing the floor function ($\lfloor \; \rfloor$) from Eq.3 and Eq.4 above, Eq.5 and Eq.6 below are given approximately:

$$P(2i)=C(2i)-\tfrac{1}{4} \cdot C(2i-1)-\tfrac{1}{4} \cdot C(2i+1)-\tfrac{1}{2} \qquad \text{Eq.5}$$

$$P(2i+1)=C(2i+1)+P(2i)/2+P(2i+2)/2 \qquad \text{Eq.6}$$

$$=-\tfrac{1}{8} \cdot C(2i-1)+\tfrac{1}{2} \cdot C(2i)+3/4 \cdot C(2i+1)+\tfrac{1}{2} \cdot C(2i+2)-\tfrac{1}{8} \cdot C(2i+3)-\tfrac{1}{2}$$

From Eq.5 and Eq.6, following 5 equations are given:

$$P(2i-1)=-\tfrac{1}{8} \cdot C(2i-3)+\tfrac{1}{2} \cdot C(2i-2)+\tfrac{3}{4} \cdot C(2i-1)+\tfrac{1}{2} \cdot C(2i)-\tfrac{1}{8} \cdot C(2i+1)-\tfrac{1}{2};$$

$$P(2i)=C(2i)-\tfrac{1}{4} \cdot C(2i-1)-\tfrac{1}{4} \cdot C(2i+1)-\tfrac{1}{2};$$

$$P(2i+1)=-\tfrac{1}{8} \cdot C(2i-1)+\tfrac{1}{2} \cdot C(2i)+\tfrac{3}{4} \cdot C(2i+1)+\tfrac{1}{2} \cdot C(2i+2)-\tfrac{1}{8} \cdot C(2i+3)-\tfrac{1}{2};$$

$$P(2i+2)=C(2i+2)-\tfrac{1}{4} \cdot C(2i+1)-\tfrac{1}{4} \cdot C(2i+3)-\tfrac{1}{2};$$

$$P(2i+3)=-\tfrac{1}{8} \cdot C(2i+1)+\tfrac{1}{2} \cdot C(2i+2)+\tfrac{3}{4} \cdot C(2i+3)+\tfrac{1}{2} \cdot C(2i+4)-\tfrac{1}{8} C(2i+5)-\tfrac{1}{2}.$$

If a highpass coefficient C(2i+1) has a unit quantization error, these 5 equations show that the error effects on 5 pixels. Assuming that these effected errors are decorrelated, the root of sum of squared errors on 5 pixels is given as follows:

$$\sqrt{[(-\tfrac{1}{8})^2+(-\tfrac{1}{4})^2+(\tfrac{3}{4})^2+(-\tfrac{1}{4})^2+(-\tfrac{1}{8})^2]}=0.85$$

This means that the unit error in high pass coefficient is transformed into the pixel value error of 0.85. This is the root of inverse highpass filter gain.

Similarly, if a lowpass coefficient C(2i) has a unit quantization error, these 5 equations show that the error effects on 3 pixels and the root of sum of squared errors on 3 pixels is given as follows:

$$\sqrt{[(\tfrac{1}{2})^2+1^2+(\tfrac{1}{2})^2]}=1.2$$

This means that the unit error in lowpass coefficient is transformed into the pixel value error of 1.2. This is the root of inverse lowpass filter gain.

Additionally, when applying a 2-dimensional inverse wavelet transform, LL coefficients need the inverse transform twice (horizontally and vertically). Then, the unit error in LL coefficient is transformed into the error of 1.2×1.2.

This is the root of LL subband gain. Similarly, the unit error in HL or LH coefficient is transformed into the error of:

1.2×0.85

This is the root of HL and HL subband gain

For example, the next tables show the root of each subband gain in case the number of decomposition levels is 5.

The values in these tables are used in calculation for the embodiments of the present invention described later.

| SQUIRE ROOT OF SUBBAND GAIN IN 9 × 7 INVERSE TRANSFORM | | | | | |
|---|---|---|---|---|---|
| | decomposition level | | | | |
| | 5 | 4 | 3 | 2 | 1 |
| LL | 29.4 | 14.9 | 7.6 | 3.9 | 2.0 |
| HL | 15.1 | 7.7 | 3.9 | 2.0 | 1.0 |

-continued

SQUIRE ROOT OF SUBBAND GAIN IN 9 × 7 INVERSE TRANSFORM

| | decomposition level | | | | |
|---|---|---|---|---|---|
| | 5 | 4 | 3 | 2 | 1 |
| LH | 15.1 | 7.7 | 3.9 | 2.0 | 1.0 |
| HH | 7.8 | 4.0 | 2.0 | 1.0 | 0.5 |

SQUIRE ROOT OF SUBBAND GAIN IN 5 × 3 INVERSE TRANSFORM

| | decomposition level | | | | |
|---|---|---|---|---|---|
| | 5 | 4 | 3 | 2 | 1 |
| LL | 7.6 | 5.1 | 3.4 | 2.3 | 1.5 |
| HL | 5.3 | 3.5 | 2.3 | 1.6 | 1.0 |
| LH | 5.3 | 3.5 | 2.3 | 1.6 | 1.0 |
| HH | 3.6 | 2.4 | 1.6 | 1.1 | 0.7 |

Furthermore the gain of inverse component transform are given similarly. These gains are the sums of squared errors in original (usually RGB) components caused by a unit error in the transformed component (usually YCbCr) domain. The squared error of inverse ICT (irreversible component transform) gain and inverse RCT (reversible component transform) gain are shown in the following tables.

SQUIRE ROOT IN INVERSE ICT

| Y | 1.7 |
|---|---|
| Cb | 1.8 |
| Cr | 1.6 |

SQUIRE ROOT IN INVERSE RCT

| Y | 1.7 |
|---|---|
| Cb | 0.8 |
| Cr | 0.8 |

Additionally, the definition of component transforms are shown below:

(1) Reversible Component Transform:

Reversible component transform is called RCT (Reversible multiple component transform), and has a characteristic in that coefficients in the formula are integers. The formulas thereof are shown below:

$$Y_0(x, y) = \left\lfloor \frac{I_0(x, y) + 2 * I_1(x, y) + I_2(x, y)}{4} \right\rfloor$$

$$Y_1(x, y) = I_2(x, y) - I_1(x, y)$$

$$Y_2(x, y) = I_0(x, y) - I_1(x, y)$$

$$I_1(x, y) = Y_0(x, y) - \left\lfloor \frac{Y_2(x, y) + Y_1(x, y)}{4} \right\rfloor$$

$$I_0(x, y) = Y_2(x, y) + I_1(x, y)$$

$$I_2(x, y) = Y_1(x, y) + I_1(x, y)$$

(2) Irreversible Component Transform:

Irreversible component transform is called ICT (Irreversible multiple component transform), and has a characteristic in that coefficients in the formula are real numbers. The formulas thereof are shown below:

$$Y_0(x,y) = 0.299 * I_0(x,y) + 0.587 * I_1(x,y) + 0.114 * I_2(x,y)$$

$$Y_1(x,y) = -0.16875 * I_0(x,y) - 0.33126 * I_1(x,y) + 0.5 * I_2(x,y)$$

$$Y_2(x,y) = 0.5 * I_0(x,y) - 0.41869 * I_1(x,y) - 0.08131 * I_2(x,y)$$

$$I_0(x,y) = Y_0(x,y) + 1.402 * Y_2(x,y)$$

$$I_1(x,y) = Y_0(x,y) - 0.34413 * Y_1(x,y) - 0.71414 * Y_2(x,y)$$

$$I_2(x,y) = Y_0(x,y) + 1.772 * Y_1(x,y)$$

In these formulas, in case where an original image has RGB components, I0 corresponds to R; I1 corresponds to G; I2 corresponds to B; Y0 corresponds to Y; Y1 corresponds to Cb; and Y2 corresponds to Cr.

Next, an operation of the electronic camera apparatus of according to the present embodiment will be described (or an operation at a time of taking a still picture).

Figure 4:
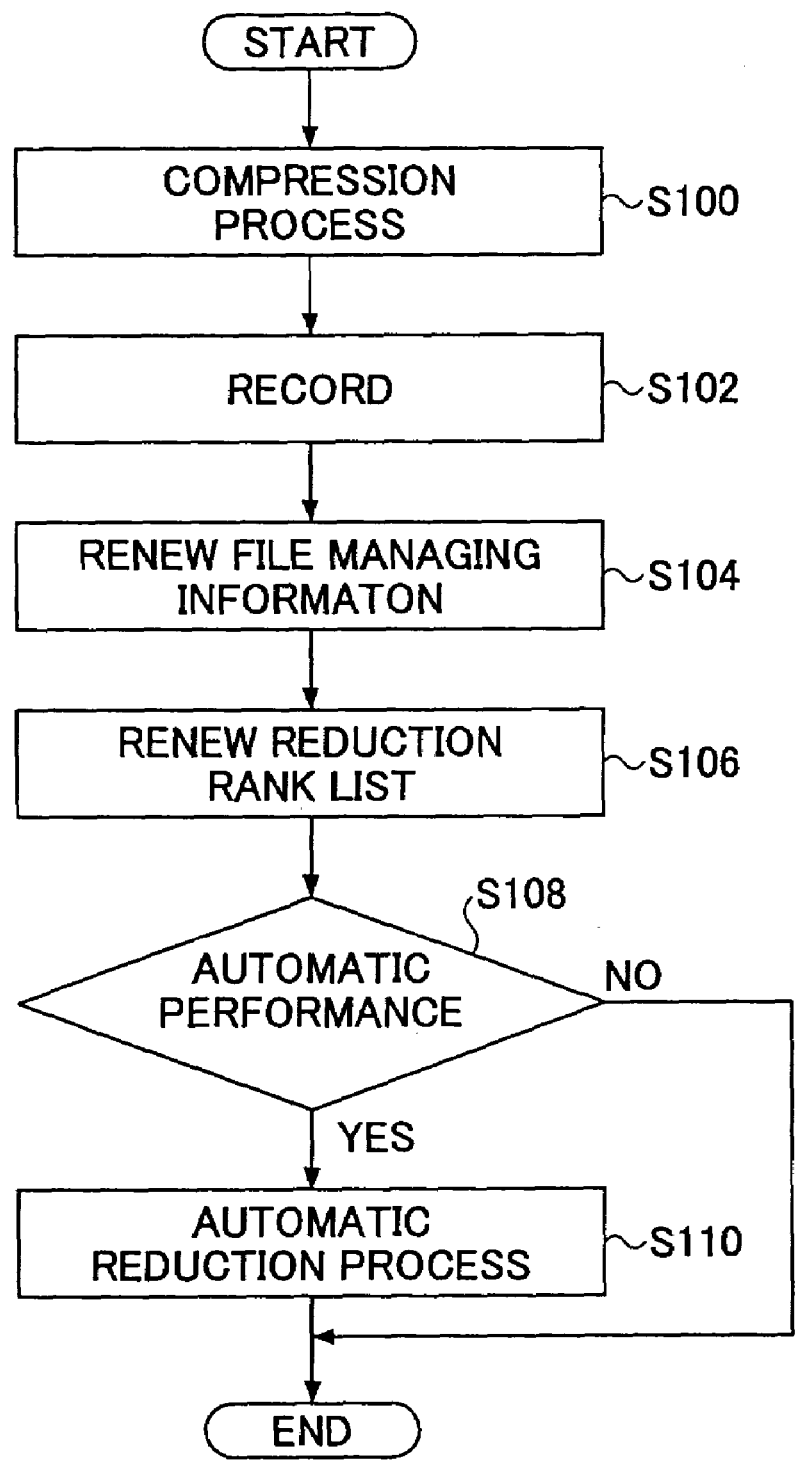
FIG. 4 is a flow chart for explaining an operation at the time of taking a still picture.

One example of an operation at the time of taking a still picture is described below with reference to a flow chart shown in FIG. 4. When a release button (not shown) included in the operation part 124, that is a button for ordering taking a still picture, is pushed, an order for taking the still picture is given to the image processor 110 by the system controller 122 so that the image processor 110 drives the image sensor 104 under conditions for taking a still picture. The image data of the still pictures are tile-divided for every respective component by the image processor 110 so as to be sent to the image compression/elongation part 150 to be compression-processed (STEP 100). In the image compression/elongation part 150, a lossless compression is performed at the entropy coding part 158. At the code generation part 160, a post-quantizing corresponding to an image quality mode such as a high image quality, a standard image quality, an economy image quality, or the like, is performed. The image quality is preset with the operation part 124 by an operator (a user). In a case where the image quality mode is not preset, an image quality mode of default is selected and designated to the image compression/elongation part 150 by the system controller 122. It may be possible to not perform the post-quantization at the time of using the high image quality mode. The above mentioned example is included in the present invention.

At the time of the coding process, the management information storing part 164 obtains, for example, an amount of lossless code, an amount of code after post-quantized (amount of present code), the total number of non-zero bitplanes, an image quality mode, an image size, and the like, as information for determining a remaining force (capability) for reducing the amount of compressed image data, namely, information for determining the rank of a process for reducing the amount of compressed image data. The amount of lossless code and the amount of code after post-quantized can be obtained by the code generation part 160. The amount of lossless code to which added visual weight is given for every sub-band and the amount of code after post-quantization may be obtained. The above mentioned example is included in the present invention. The total number of the non-zero bitplanes can be calculated by subtracting the zero pit plane number obtained from the packet header of the code data from the total bitplane number. The total number of the non-zero bitplanes or the zero bitplane number may be obtained by the code generation part 160 and sent to the management information storing part 164. The image size and image quality mode are designated by the system controller 122 and may be obtained from the main header of the code data. It is not necessary to obtain all of this information. Rather, only the part of the information that is necessary for determining the remaining force (capability) for reducing the amount of the image data may be obtained.

The file managing part 166 records code data output by the image compression/elongation part 150 to the recording medium 170 as an image file of JPEG2000 (STEP 102). The file managing information on the management information storing part 164 is renewed after completing recording (STEP 104). Information obtained at STEP 100 is included in the file managing information. A photographer can operate "designation of my favorite", "designation of allowance of monochrome-making", and "designation of allowance of size changing" for processing the image file that is recorded just after photographing or at a designated timing. This information is included in the file managing information. Information recording the number of times of application of the reduction process of the amount of the data for the respective image files is also included the file managing information. Furthermore, information recording the unused capacity of the recording medium 170 is also included in the file managing information. Furthermore, information recording the distinction of the image file of the still picture and the motion picture is also included in the file managing information.

A specific storing area on the recording medium 170 is allocated to the management information storing part 164. Because of the above mentioned structure, even in a case where the recording medium 170 is exchanged, it is not necessary to reproduce the file managing information and reduction rank list regarding the image file on the recording medium 170. Furthermore, a copy of the file managing information and reduction rank list regarding the image file on the management information storing part 164 may be recorded on the recording medium 170. Because of the above mentioned structure, there is an advantage in that the file managing information and the reduction rank list can be reconstructed on the management information storing part 164 by only reading a copy of the file managing information and the reduction rank list without referring to the image file of the recording medium 170 when the recording medium 170 is exchanged.

The data amount reduction managing part 162 refers to specific information in file management information stored in the managing information storing part 164. The data amount reduction managing part 162 determines the data amount reduction remaining force of an image file added this time, under a specific determination criterion based on the above mentioned specific information so as to determine its data amount reduction rank. As a result of this, the reduction rank list on the management information storing part 164 is renewed (STEP 106). This reduction rank list is a list for arranging indexes of all of the image files (or a higher ranked "n" number of image files that have a large data amount reduction remaining force), according to the data amount reduction rank (order). The data amount reduction rank is basically determined to give precedence to one having a large data amount reduction remaining force in terms of image quality. Examples of specific determination criteria for the data amount reduction remaining force are as follows.

1. Criterion 1:

An image file having a large value of "the amount of the present code/the amount of the lossless code" is given a priority. Since the above mentioned ratio represents a reduction degree of the amount of information at present time, the image file having a large value of the above mentioned ratio has a large data amount reduction remaining force.

2. Criterion 2:

An image file having a large value of "the amount of the present code to which added visual weight is given every sub-band/the amount of the lossless code to which added visual weight is given every sub-band" is given a priority. This ratio is calculated by normalizing the denominator and numerator of the above mentioned criterion 1 so as to form an information amount that is effective visually.

3. Criterion 3:

An image file having a large value of "the amount of the present code/the total number of the non-zero bitplanes" is given a priority. What "the total number of the non-zero bitplanes" is large means is that an absolute value of the wavelet coefficients is large, namely that the amount of the lossless code is large.

4. Criterion 4:

An image file having a large value of image size is given a priority. Since the image having a large size has high redundancy, little deterioration of the image quality will occur.

5. Criterion 5:

An image having a small total amount of non zero bitplanes are given a priority. Since the image having small total amount of non-zero bitplanes has few high frequency components and a high possibility of photographic failure due to blurring, it is difficult to further cause a problem of deterioration of image quality due to data amount reduction.

6. Criterion 6:

An image file having a small value of "sum of truncated bitplanes or sum of truncated subbitplanes" is given a priority. Since the above sum represents a sum of reduced bits from an original coefficients, the image file having a small value of the above mentioned sum has a large data amount reduction remaining force.

7. Criterion 7:

An image file having a small value of "sum of truncated bitplanes or sum of truncated subbitplanes which is determined considering the quantization step sizes." is given a priority. Since the above sum represents a sum of reduced bits from an original coefficients, the image file having a small value of the above mentioned sum has a large data amount reduction remaining force.

8. Criterion 8:

An image file having a small value of "sum of truncated bitplanes or sum of truncated subbitplanes which is determined considering the subband gains" is given a priority. Since the above sum represents a sum of reduced bits from an original image in the spatial domain (after inverse frequency transform, for example, inverse wavelet transform), the image file having a small value of the above mentioned sum has a large data amount reduction remaining force.

9. Criterion 9:

An image file having a small value of "sum of truncated bitplanes or sum of truncated subbitplanes which is determined considering the inverse component transform gains" is given a priority. Since the above sum represents a sum of reduced bits from an original components in the spatial domain (after inverse component transform, for example, inverse RCT), the image file having a small value of the above mentioned sum has a large data amount reduction remaining force.

10. Criterion 10:

An image file having a small value of "sum of truncated bitplanes or sum of truncated subbitplanes which is determined considering the human visual character" is given a priority. Since the above sum represents a sum of reduced bits in terms of human visual character, it represents the subjective degradation of the image quality. Then the image file having a small value of the above mentioned sum has a large data amount reduction remaining force.

11. Criterion 11:

An image file having a small value of "sum of quantization error" is given a priority. Since the above sum represents a sum of difference between an original image and compressed image file, it represents the degradation of the compressed image file directly. Then the image file having a small value of the above mentioned sum has a large data amount reduction remaining force.

12. Criterion 12:

An image file having a small value of "sum of quantization error considering the truncated bitplanes (or truncated subbitplanes) and quantization step sizes" is given a priority. Since the above sum represents a sum of difference between an original coefficients and compressed coefficients, it represents the degradation of the compressed image file directly. Then the image file having a small value of the above mentioned sum has a large data amount reduction remaining force.

13. Criterion 13:

An image file having a small value of "sum of quantization error considering the subband gains" is given a priority. Since the above sum represents a sum of difference between an original image and compressed image in the spatial domain (after inverse frequency transform, for example, inverse wavelet transform), it represents the degradation of the compressed image file directly. Then the image file having a small value of the above mentioned sum has a large data amount reduction remaining force.

14. Criterion 14:

An image file having a small value of "sum of quantization error considering the inverse component transform gains" is given a priority. Since the above sum represents a sum of difference between an original image and compressed image in the spatial domain (after inverse component transform, for example, inverse RCT), it represents the degradation of the compressed image file directly. Then the image file having a small value of the above mentioned sum has a large data amount reduction remaining force.

15. Criterion 15:

An image file having a small value of "sum of quantization error considering the human visual character" is given a priority. Since the above sum represents a sum of difference-between an original image and compressed image in terms of human visual character, it represents the subjective degradation of the image quality. Then the image file having a small value of the above mentioned sum has a large data amount reduction remaining force.

16. Criterion 16:

An image file photographed at a high image quality mode is given a priority. In a case of a high image quality, even if the data amount reduction is performed, the image file can maintain good image quality.

17. Criterion 17:

An image file having a small number of times of an application of the data amount reduction process is given to a priority. The image file having a small number of times of the application of the data amount reduction process generally has better image quality than an image file having a large number of times of the application of the data amount reduction process.

18. Criterion 18:

An image file of a motion picture is given a higher priority than an image file of a still picture. A motion picture is not required to have as high an image quality as a still picture.

19. Criterion 19:

In image files of motion pictures, an image file of a motion picture having a larger average value or maximum value of the ratio of the criterion (1) or (3) is given a priority.

20. Criterion 20:

In frames in motion pictures, a frame having a larger ratio of the criterion (1), (2), or (3) is given a priority.

The above mentioned criteria are determination criteria in terms of image quality. In this embodiment, the following criteria can be applied.

21. Criterion 21:

An image file to which "size change allowance designation" or "monochrome-making allowance designation" is designated by the photographer is given a priority. This criterion is based on the will of the photographer. In the files having these designations, the photographer allows the data amount reduction and designates its method. Since an image film having "designation of my favorite" of the photographer is a file in which the photographer desires to prevent the deterioration of image quality, namely to which protection is designated, the image film having "designation of my favorite" of the photographer is not a subject to data amount reduction.

22. Criterion 22:

An image file having an old date (the recording data of the image file) is recorded is given a priority. This criterion is based on the elapsed time since recording. This is because, generally, an old image is given "designation of my favorite" if the image is important to the photographer or is to be copied to another recording medium.

Based on the above descriptions, "sum of non-zero bitplanes", mentioned above to be applied to the embodiment of the present invention, can be given as follows, for example. "Sum of non-zero bitplanes" represents the total number of bits to be actually coded; it represents the amount of data included in the original image. Then, "original coded length/sum of non-zero bitplanes" can be used as a criterion.

Using the notations below:
Number of maximum bitplanes: MBP;
Number of zero bitplane in the codeblock: ZBP; and
Number of coefficients in the codeblock: N.

Then, "sum of non-zero bitplanes" can be calculated as follows:

$$\sum_{\text{(for component)}} \sum_{\text{(for subband)}} \sum_{\text{(for codeblock)}} \{(MBP - ZBP) \times N\}$$

Exactly, this equation means the summation of

[('number of maximum bitplanes'−'number of zero bitplane in the codeblock')×'number of coefficients in the codeblock']

for all codeblocks, all subbands, and all components.

That is to say, this equation calculates the "summation of non-zero bits for all wavelet coefficients". Then, it might be better to call as "sum of non-zero bits" rather than "sum of non-zero bitplanes".

Similarly, "sum of truncated subbitplanes", mentioned above to be applied to the embodiment of the present invention, can be given as follows, for example:

Using the notations below:
Number of non-zero subbitplane in the codeblock: NZSBP;
Number of coded subbitplanes in the codeblock: CSBP; and
Number of coefficients in the codeblock: N.

"Sum of truncated subbitplanes (might better to call as subbits)" can be calculated as:

$$\sum_{\text{(for component)}} \sum_{\text{(for subband)}} \sum_{\text{(for codeblock)}} \{(NZSBP - CSBP) \times N\}$$

Similarly, this equation means the summation of:

[('number of no-zero subbitplanes'−'number of coded subbitplane in the codeblock')×'number of coefficients in the codeblock']

for all codeblocks, all subbands, and all components.

Similarly, "sum of truncated bitplanes" can be given as follows, for example:

Using the notations below:
Number of non-zero bitplane in the codeblock: NZBP;
Number of coded bitplanes in the codeblock: CBP; and
Number of coefficients in the codeblock: N.

"Sum of truncated bitplanes (might be better to call as bits)" can be calculated as:

$$\sum_{\text{(for component)}} \sum_{\text{(for subband)}} \sum_{\text{(for codeblock)}} \{(NZBP - CBP) \times N\}$$

Similarly, this equation means the summation of:

[('number of no-zero bitplanes'−'number of coded bitplane in the codeblock')×'number of coefficients in the codeblock']

for all codeblocks, all subbands, and all components.

As mentioned above, since the number of subbitplanes is approximately 3 times of the number of bitplanes, the simple equation is used here:

$CBP=\text{ceil}(CSBP/3)$ where 'ceil' means the rounding towards the equal or larger integer.

In case of application of linear quantization, 'sum of truncated bitplanes in consideration of quantization step size' may also be calculated for example, in consideration of linear quantization further than the above-mentioned truncated subbitplanes, as follows:

Using the notations below:
Number of non-zero subbitplane in the codeblock: NZSBP;
Number of coded subbitplanes in the codeblock: CSBP;
Quantization step size for a subband including the codeblock: Q;
Number of truncated subbitplanes for the codeblock: TSBP (in this case, the truncation includes a truncation made according to the linear quantization); and
Number of coefficients in the codeblock: N.

"Sum of truncated bitplanes (might be better to call as bits)" can be calculated as:

$$\sum_{\text{(for component)}} \sum_{\text{(for subband)}} \sum_{\text{(for codeblock)}} \{TSBP \times N\}$$

where $QSBP=3\log_2 Q$; and $TSBP=NZSBP-CSBP-QSBP$.

This is because, quantization on coefficients with the quantization step size Q corresponds to a truncation of $\log_2 Q$ bitplanes, i.e., a truncation of $3\log_2 Q$ subbitplanes. Also in the case of 5×3, this formula can be applied with an application of Q=1.

This 'sum of truncated subbitplanes in consideration of quantization step size' in which linear quantization is considered may also be regarded as an index which directly indicates the amount of data already reduced from the original data.

Similarly, 'sum of truncated bitplanes' is calculated further in consideration of linear quantization, as follows:

Using the notations below:
Number of non-zero subbitplane in the codeblock: NZBP;
Number of coded bitplanes in the codeblock: CBP;
Quantization step size for a subband including the codeblock: Q;
Number of truncated bitplanes for the codeblock: TBP (in this case, the truncation includes a truncation made in the linear quantization); and
Number of coefficients in the codeblock: N.

Then, the following calculation is made:

$$\sum_{\text{(for component)}} \sum_{\text{(for subband)}} \sum_{\text{(for codeblock)}} \{TBP \times N\}$$

where $QBP=3\log_2 Q$; and $TBP=NZBP-CBP-QBP$.

This is because, quantization on coefficients with the quantization step size Q corresponds to a truncation of $\log_2 Q$ bitplanes. Also in the case of 5×3 wavelet transform, this formula can be applied with Q=1.

This 'sum of truncated bitplanes in consideration of quantization step size' in which linear quantization is considered may also be regarded as the index which directly indicates the amount of data already reduced from the original data, to be applied to the embodiment of the present invention for selecting an image data unit to be erased for creating an unused capacity.

Furthermore, as described above, the $\sqrt{Gsb}$ is multiplied when the coefficients are returned to RGB values in the wavelet inverse transform. This means that the number of truncated subbitplanes is increased by $3\log_2\sqrt{Gsb}$. In terms of bitplanes, the number thereof increases by $\log_2\sqrt{Gsb}$. Even without consideration of the Gsb, the resulting value can be used as the index of reduced data for the purpose of a comparison to be made between codes on a common decomposition level, for example. However, the value of Gsb differs according to the subband. Accordingly, it is possible to obtain the index of reduced data amount which is more generalized one by the consideration thereof.

Accordingly, according to the embodiment of the present invention, the subband gain may be considered further than the above-mentioned number of truncated subbitplanes. Thus, 'sum of truncated subbitplanes in consideration of subband gain' may be calculated as follows:

Using the notations below:
Number of non-zero subbitplane in the codeblock: NZSBP;
Number of coded subbitplanes in the codeblock: CSBP;
Quantization step size for a subband including the codeblock: Q;
Subband gain on the subband including the codeblock: Gsb;
Number of truncated subbitplanes for the codeblock: TSBP (in this case, the truncation includes a truncation made in the linear quantization); and
Number of coefficients in the codeblock: N.

$$\sum_{(\text{for component})} \sum_{(\text{for subband})} \sum_{(\text{for codeblock})} \{TSBP \times N\}$$

where $QSBP=3\log_2 Q$; $GSBP=3\log_2\sqrt{Gsb}$; and $TSBP=NZSBP-CSBP-QSBP-GSPB$.

Also in case of 5×3 wavelet transform, this formula can be applied with Q=1.

Similarly, 'sum of truncated bitplanes' may be calculated further in consideration of linear quantization, as follows:

Using the notations below:
Number of non-zero subbitplane in the codeblock: NZBP;
Number of coded bitplanes in the codeblock: CBP;
Subband gain on the subband including the codeblock: Gsb;
Quantization step size for a subband including the codeblock: Q;
Number of truncated bitplanes for the codeblock: TBP (in this case, the truncation includes a truncation made in the linear quantization); and
Number of coefficients in the codeblock: N.
Then, $$\sum_{(\text{for component})} \sum_{(\text{for subband})} \sum_{(\text{for codeblock})} \{TBP \times N\}$$

where $QBP=\log_2 Q$; $GBP=\log_2\sqrt{Gsb}$; and $TBP=NZBP-CBP-QBP-GBP$.

Also in case of 5×3, this formula can be applied with Q=1.

It is well known that the human vision is more sensitive on a low frequency than on high frequency in image. As a result, a human is more sensitive on the quantization errors in low frequency subbands than on those in high frequency subbands. This means that it is desirable to select large quantization step sizes for high frequency subbands and small step sizes for low frequency subbands in terms of transform efficiency. That is to say, it is desirable to truncate many bitplanes for high frequency subbands and a few bitplanes for low frequency subbands.

Reflecting the above human vision character, the JPEG2000 standard discloses the amount called "Visual Weight", which represents the visual importance for each subband's coefficient. "Visual Weight" is a function of viewing distance, and the standard discloses some kind of weight tables. Examples of the tables are shown below, and larger the weight value is, the more important visually the subband is. The standard says that the typical way of applying this weight is to divide the typical quantization step size for the subband by the weight for the relevant subband. Then a visually optimized quantization step size is given.

| WEIGHT FOR A CASE OF 9 × 7 | | | | | | |
|---|---|---|---|---|---|---|
| | | decomposition level | | | | |
| | | 5 | 4 | 3 | 2 | 1 |
| | | 9 × 7, weight Viewing distance 1700 | | | | |
| Y | LL | 1 | 1 | 1 | 1 | 1 |
| | HL | 1 | 1 | 1 | 0.86159 | 0.30719 |
| | LH | 1 | 1 | 1 | 0.86159 | 0.30719 |
| | HH | 1 | 1 | 1 | 0.74234 | 0.10892 |
| | | 5 | 4 | 3 | 2 | 1 |
| Cb | LL | 1 | 1 | 1 | 1 | 1 |
| | HL | 0.81877 | 0.6894 | 0.50165 | 0.28007 | 0.09782 |
| | LH | 0.81877 | 0.6894 | 0.50165 | 0.28007 | 0.09782 |
| | HH | 0.74588 | 0.57922 | 0.36228 | 0.15229 | 0.03118 |
| Cr | LL | 1 | 1 | 1 | 1 | 1 |
| | HL | 0.86089 | 0.75763 | 0.59854 | 0.38849 | 0.17744 |
| | LH | 0.86089 | 0.75763 | 0.59854 | 0.38849 | 0.17744 |
| | HH | 0.80317 | 0.66595 | 0.47089 | 0.24857 | 0.07713 |

In terms of truncation, if we apply these weights for the number of truncated subbitplanes of each subband, we can get more appropriate criterion for the amount of reduced data. Since dividing the step sizes by the weight W corresponds to multiplying W to the coefficients, it is equal to truncate the subbitplanes less by the amount of $3\log_2 W$.

Accordingly, when the above-mentioned subband gain and also this visual weight are considered for the above-mentioned number of truncated subbitplanes, 'sum of truncated subbitplanes in consideration of subband gain and visual weight' is obtained, as follows, according to the embodiment of the present invention:

Using the notations below:
Number of non-zero subbitplane in the codeblock: NZSBP;
Number of coded subbitplanes in the codeblock: CSBP;
Quantization step size for a subband including the codeblock: Q;
Subband gain on the subband including the codeblock: Gsb;
Visual Weight on the subband including the codeblock: W;
Number of truncated subbitplanes for the codeblock: TSBP (in this case, the truncation includes a truncation made in the linear quantization); and
Number of coefficients in the codeblock: N.

$$\sum_{(\text{for component})} \sum_{(\text{for subband})} \sum_{(\text{for codeblock})} \{TSBP \times N\}$$

where $QSBP=3\log_2 Q$; $GSBP=3\log_2\sqrt{Gsb}$; $WSBP=3\log_2 W$; and $TSBP=NZSBP-CSBP-QSBP-GSPB+WSBP$.

Also in the case of 5×3, this formula can be applied with Q=1.

Similarly, 'sum of truncated bitplanes' is calculated further in consideration of linear quantization, as follows:

Using the notations below:
Number of non-zero subbitplane in the codeblock: NZBP;
Number of coded bitplanes in the codeblock: CBP;
Subband gain on the subband including the codeblock: Gsb;
Visual Weight on the subband including the codeblock: W;
Quantization step size for a subband including the codeblock: Q;
Number of truncated bitplanes for the codeblock: TBP (in this case, the truncation includes a truncation made according to the linear quantization); and
Number of coefficients in the codeblock: N.
Then, $$\sum_{(for\ component)} \sum_{(for\ subband)} \sum_{(for\ codeblock)} \{TBP \times N\}$$

where $QBP=\log_2 Q$; $GBP=\log_2 \sqrt{Gsb}$; $WBP=\log_2 W$; and $TBP=NZBP-CBP-QBP-GBP+WBP$.

Also in case of 5×3, this formula can be applied with Q=1.

The above-mentioned described manner applies the number of truncated subbitplanes as the index applied for selecting an image data unit to be erased for creating an unused capacity, and, thus, in other words, it applies the quantization error as the index. This is because a truncation of n bitplanes is equivalent to a linear quantization with a equalization step size ($=2^n$), and an average quantization error occurring in this case is a half the quantization step size, i.e., $2^{n-1}$. Similarly, a truncation of n subbitplanes is equivalent to a linear quantization with a quantization step size ($=2^{n/3}$), and an average quantization error occurring in this case is a half the quantization step size, i.e., $2^{n/3-1}$. Then, by further considering the above-mentioned visual weight, a further generalized index of the already reduced data which reflects the visual characteristics can be obtained.

Accordingly, according to the embodiment of the present invention, 'sum of visual errors in consideration of subband gain and visual weight' may be calculated as follows:
Using the notations below:
Number of non-zero subbitplane in the codeblock: NZSBP;
Number of coded subbitplanes in the codeblock: CSBP;
Quantization step size for a subband including the codeblock: Q;
Subband gain on the subband including the codeblock: Gsb;
Visual Weight on the subband including the codeblock: W;
Number of truncated subbitplanes for the codeblock: TSBP (in this case, the truncation does not include a truncation made according to the linear quantization); and
Number of coefficients in the codeblock: N.

$$\sum_{(for\ component)} \sum_{(for\ subband)} \sum_{(for\ codeblock)} \{2^{TSBP/3-1} \times \sqrt{(Gsb)/(Q/W) \times N}\}$$

where TSBP=NZSBP−CSBP.

Also in case of 5×3, this formula can be applied with Q=1.

The sum of errors may instead be obtained in a form of sum of squares, as follows:

$$\sum_{(for\ component)} \sum_{(for\ subband)} \sum_{(for\ codeblock)} \{2^{2TSBP/3-2} \times Gsb/(Q/W)^2 \times N\}$$

where TSBP=NZSBP−CSBP.

Similarly, another 'sum of visual errors in consideration of subband gain and visual weight' may be obtained as follows:
Using the notations below:
Number of non-zero bitplane in the codeblock: NZBP;
Number of coded bitplanes in the codeblock: CBP;
Subband gain on the subband including the codeblock: Gsb;
Visual Weight on the subband including the codeblock: W;
Quantization step size for a subband including the codeblock: Q;
Number of truncated bitplanes for the codeblock: TBP (in this case, the truncation does not include a truncation made according to the linear quantization); and
Number of coefficients in the codeblock: N.
Then, $$\sum_{(for\ component)} \sum_{(for\ subband)} \sum_{(for\ codeblock)} \{2^{TBP-1} \times \sqrt{(Gsb)/(Q/W) \times N}\}$$

where TBP=NZBP−CBP.

Also in case of 5×3, this formula can be applied with Q=1.

The sum of errors may instead be obtained in a form of sum of squares, as follows:

$$\sum_{(for\ component)} \sum_{(for\ subband)} \sum_{(for\ codeblock)} \{2^{2TBP-2} \times Gsb/(Q/W)^2 \times N\}$$

where TBP=NZBP−CBP.

As described above, in case of applying color transform among components, other than the above-mentioned Gsb, Gct which is a gain on an inverse component transform may be considered for each component. In this case, instead of Gsb, (Gsb×Gct) may be used. Furthermore, as the visual weight for 5×3, the same for 9×7 is modified in a manner that the values of Cb and Cr are halved may be used.

Furthermore, in order that the visual weight is reflected for each subband with respect to the above-mentioned amount of present code and amount of lossless code, the following manner may be applied:
Amount of lossless code on the subband: LSLEN;
Amount of present code on the subband: CURLEN; and
Visual weight on the subband: W.

Then, an example of the amount of lossless code considering the visual characteristics is obtained as follows:

$$\sum_{(for\ component)} \sum_{(for\ subband)} \{LSLEN \times W\}$$

An example of the amount of present invention code amount considering the visual characteristics is obtained as follows:

$$\sum_{(for\ component)} \sum_{(for\ subband)} \{CURLEN \times W\}$$

The photographer can designate any number of the above mentioned criteria. This designation is done by selecting sole criterion or a combination of criteria from a menu displayed at the displaying apparatus 112. In a case where a combination of the criteria is designated, respective criteria are applied in a designated order. In a case where the photographer does not designate, pre-designated one or more criteria are applied. In a case where the criterion 10 is not designated, the ranks of the respective frames in the motion picture are equivalent.

Referring back to FIG. 4, it is possible to set an automatic action mode for the data amount reduction process. In a case where the automatic action mode is not set (STEP 108, No), the system controller 122 completes the process of the operation.

In a case where the automatic action mode for the data amount reduction process is set (STEP 108, Yes), the system controller 122 switches to the control of the data amount reduction process (STEP 110).

Figure 5:
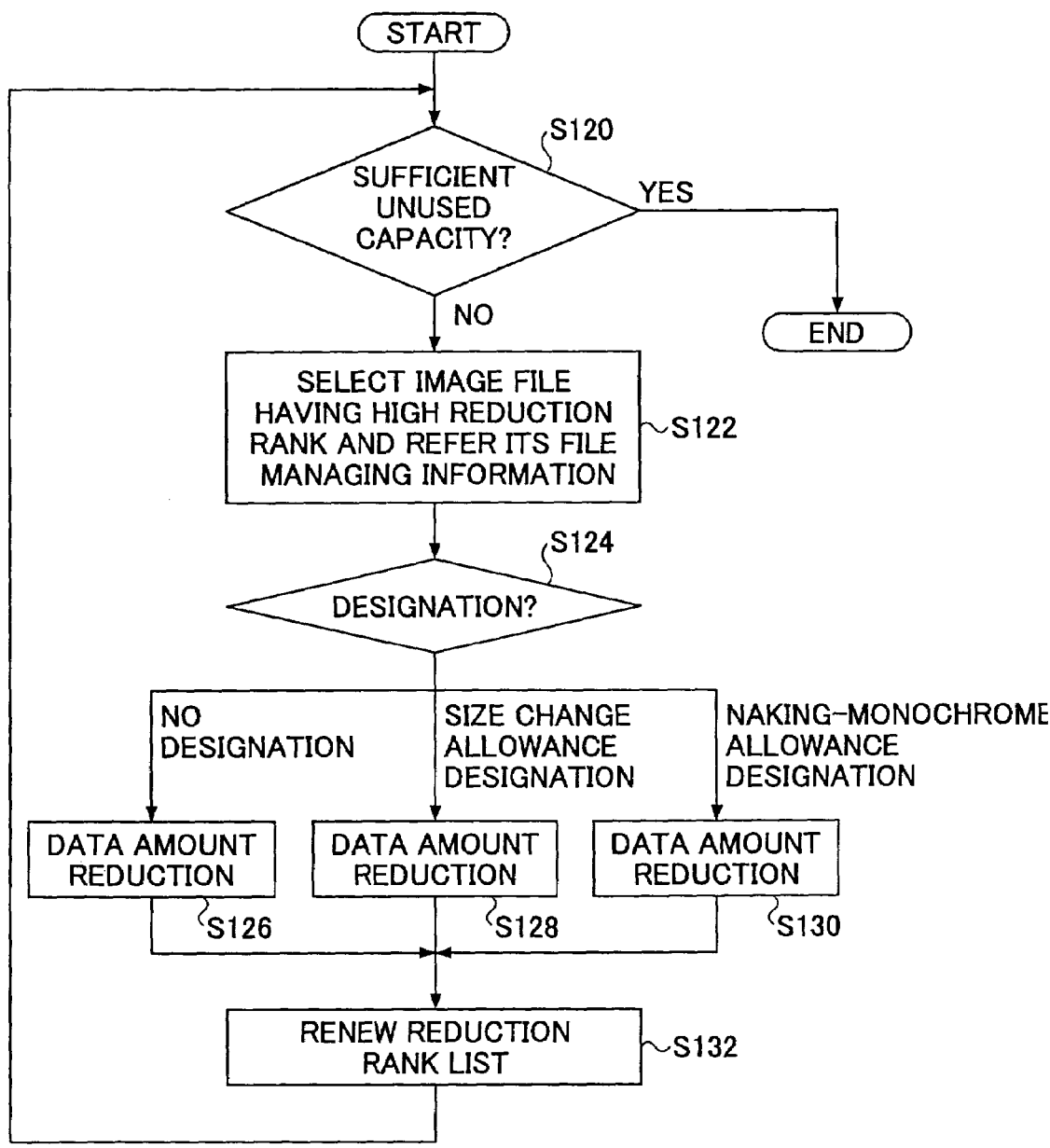
FIG. 5 is a flow chart for explaining an operation wherein a data amount reduction process performed on image data that are recorded is automatically performed.

One example of the automatic reduction process at STEP 110 is explained with reference to the flow chart of FIG. 5. The system controller 122 refers to the file management information and determines whether the recording medium 170 has an unused capacity greater than designated capacity (STEP 120). If the recording medium 140 has a sufficient unused capacity (STEP 120 Yes), the process is ended.

In a case where there is a lack of the unused capacity (STEP 120, No), the system controller 122 makes the data amount reduction management part 162 start the process for reducing the data amount. At first, the data amount reduction management part 162 selects an image file that is highest ranked at the reduction rank list and refers to its file managing information (STEP 122), and determines whether or not the image file has "size change allowance designation" or "monochrome-making allowance designation" (STEP 124).

In a case where the image file does not have either of the above-mentioned designations, the data amount reduction management part 162 goes on to the process of STEP 126. In this step, the image file is read out by the file managing part 166 and code data of the image file are transmitted to the code generation part 160 of the image compression/elongation part 150. The code generation part 160 performs a decomposition process on the data so as to decompose a code of low ranked sub-bitplane of one constant of the highest resolution degree in codes of packets. A former image file on the recording medium 170 is rewritten as an image file formed by the code data that have already been processed, at the file managing part 166. Related to this rewriting, the file managing information such as the amount of present code or the number of times of performing a data amount reduction process, is renewed. In a case where the code data of the image file forms plural layers, it is possible to delete the lower layer. The above mentioned example is included in the present invention.

In a case where the image file that is selected has "size change allowance designation", the data amount reduction management part 162 goes on to STEP 128. In this step, the image file is read out by the file managing part 166 and code data of the image file is transmitted to the code generation part 160 of the image compression/elongation part 150. The code generation part 160 performs a decomposition process so as to destruct a code of the highest resolution degree level of the data. A former image file on the recording medium 170 is rewritten as an image file formed by the code data that have already been processed, at the file managing part 166. The file managing information is renewed.

In a case where the selected image file has "monochrome-making allowance designation", the data amount reduction management part 162 goes on to the process of STEP 130.

In STEP 130, the image file is read out by the file managing part 166 and code data of the image file are transmitted to the code generation part 160 of the image compression/elongation part 150. The code generation part 160 performs decomposition process so as to destruct codes of color differences Cr and Cb of the data. The former image file on the recording medium 170 is rewritten as an image file formed by the code data that have already been processed, at the file managing part 166. The file managing information is renewed.

Next, the data amount reduction managing part 162 performs a necessary process for determining a rank with reference to renewed file managing information so as to renew the reduction rank list (STEP 132). The image file having "making-monochrome allowance designation" or "size change allowance designation" is made out of a subject to the data amount reduction process, after the data amount reduction process is performed one time. The image file having both of the designations is made out of the subject to the data amount reduction process, when the number of times of application of the data amount reduction process reaches the designated number, for example, there is only a code of the sub-bitplane of the upper ranked number bit having the highest analysis degree level.

It is possible to apply the data amount reduction process to the image file having "size change allowance designation" plural times. The above mentioned example is included in the present invention. It is also possible to apply the image file having "making-monochrome allowance designation" to the data amount reduction process substantially the same as the process for the image file having "non-designation", after making-monochrome is performed. The above mentioned example is included in the present invention. If tile division has already been performed on the image file having "size change allowance designation", it is also possible to perform the data amount reduction process by decomposing codes of some tiles. The above mentioned example is included in the present invention.

After the reduction rank list is renewed, the system controller 122 rechecks the unused capacity of the recording medium 170 (STEP 120). If there is a lack of the unused capacity (STEP 120, No), a process subsequent to the STEP 122 is made to be performed by the system controller 122.

At any timing, it is possible to order the performing of an automatic reduction process using the operation part 124. After the order is input, the system controller 122 starts the data amount reduction process as shown in FIG. 5.

The greatest concern in a case where the data amount reduction process is performed on the recorded image data is whether or not the photographer (user) can accept deterioration of the image quality. In the present invention, as shown as the criteria (1)-(9), the data amount reduction remaining force of the image data is determined in terms of the image quality and the image data having a larger data amount reduction remaining force being given a priority and selected so as to perform the data amount reduction process. Hence, it is difficult to have dissatisfaction of the photographer regarding the deterioration of image quality due to the data amount reduction. Furthermore, the criteria (11) and (12) are criteria made by considering the will of the photographer and any criteria can be selected and applied from plural criteria. Hence, it is possible to reflect the taste and will of the photographer in the selection of the image data on which the data amount reduction process is performed. For example, it is possible to obtain higher satisfaction of the photographer as compared with a case where image data having a large file size is simply selected so as to perform the data amount reduction process. Furthermore, it is not necessary for the photographer to directly select the image data to which the data amount reduction process is performed. As a result of this, usefulness of the electronic camera apparatus can be improved.

[Operation at the Time When the Motion Picture is Taken]

Figure 6:
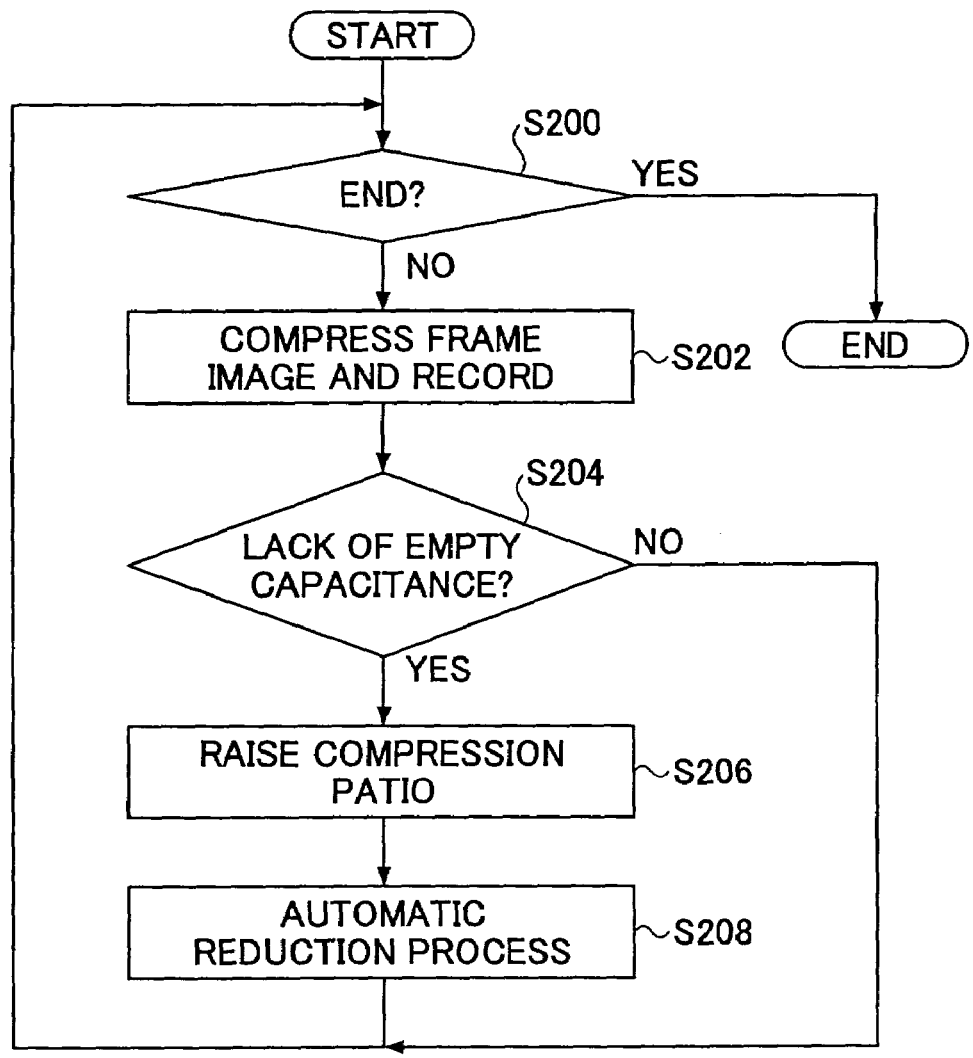
FIG. 6 is a flow chart for explaining an operation at the time of taking a motion picture.

One example of an operation at the time of taking a motion picture is described below with reference to a flow chart shown in FIG. 6. When a button for ordering the taking of a motion picture (not shown) included in the operation part 124 is pushed, an order for taking a motion picture is given to the image processor 110 by the system controller 122 so that the image processor 110 drives the image sensor 104 under conditions for taking a motion picture. The image data of the respective frames of the photographed motion picture are compressed by the substantially same steps as STEPs 100-104 as shown in FIG. 4 and recorded to the recording medium 170 so that the file managing information is renewed. Furthermore, the reduction rank list is renewed as well, as in STEP 106 shown in FIG. 4 (STEP 202). The image data of the motion picture are recorded as the image file having a file format of Motion JPEG2000.

The system controller 122 refers to the file managing information every frame and determines the unused capacity of the recording medium 170. If the lack of the unused capacity of the recording medium 170 can be assumed (STEP 204, Yes), the system controller 122 designates a compression ration having one step higher than the compression ratio that is set at present at the image compression/elongation part 150 (STEP 206). The system controller 122 also makes the data amount reduction management part 162 perform the data amount reduction process (STEP 208). Although the process of STEP 208 is substantially the same as the process shown in FIG. 5, the unused capacity is not determined in STEP 208, unlike STEP 120. In STEP 208, the data amount reduction process is performed on a designated number of on image files that are upper-ranked in the reduction rank list.

Thus, if there is concern about the lack of the unused capacity of the recording medium 170, the amount of data of the frame image newly recorded is reduced by raising the compression ratio, and the amount of the data of the image files that are already recorded is reduced, so that it is possible to avoid a state wherein recording cannot be performed during taking a motion picture due to the lack of the unused capacity. It may be possible to only reduce the amount of the data of the image file already recorded without changing the compression ratio. The above mentioned example is included in the present invention.

[Data Amount Reduction Process by the Photographer]

Figure 7:
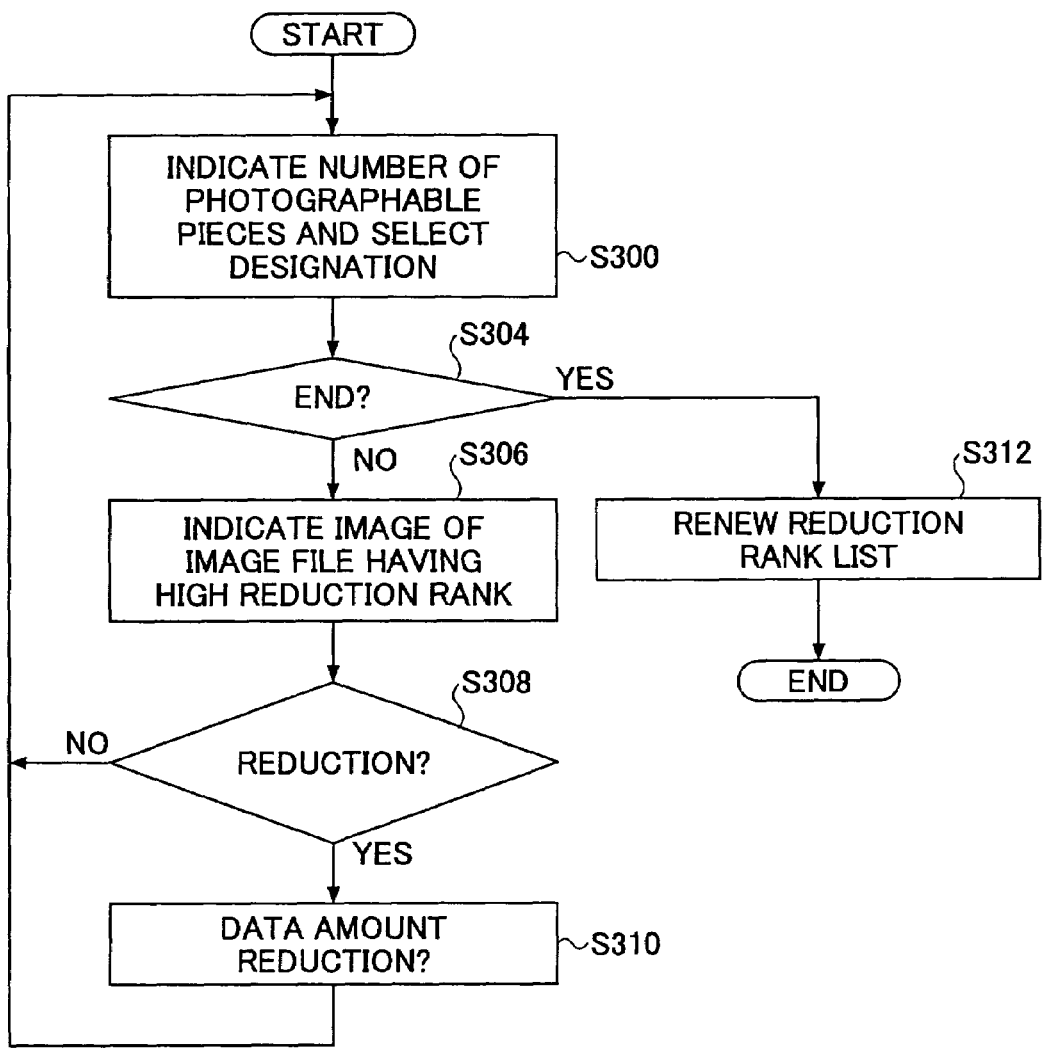
FIG. 7 is a flow chart for explaining an operation wherein a data amount reduction process performed on image data that are recorded is performed by an operator.

It is possible to select a mode of the data amount reduction process to which the photographer commits by using the operation part 124. An example of its operation will be described with reference to a flow chart shown in FIG. 7.

If this mode is selected, the system controller 122 refers to the file managing information. The system controller 122 calculates the number of pieces that can be photographed and assumed based on the unused capacity of the recording medium 170. The system processor 122 sends information indicating the number of the pieces to the image processor 110 with guidance information for designating the data amount reduction method and makes the displaying apparatus 112 to display. The photographer selects either "size change allowance designation", "making-monochrome allowance designation", "no-designation", or "end" (STEP 300). If the "size change allowance designation" or data amount reduction process for the image file to which the "size change allowance designation" is performed is desired to be performed in advance, the photographer selects the "size change allowance designation". If data amount reduction process for the image file to which the "size change allowance designation" is not performed is desired to be performed, the photographer selects "no-designation". If an end of the process is desired, the photographer can select "end".

If a designation other than "end" is selected by the photographer, the system controller 122 refers to the reduction rank list and investigates "designation" information of its file managing information based on an upper ranked image file. The system controller 122 finds the image file having the "designation" information selected by the photographer, so as to make the file managing part 166 read out the image file and sends its code data to the image compression/elongation part 150. As a result of this, image data having the lowest analysis degree level are reconstructed. The system controller 122 makes the image processor 110 scale-down-indicate the image data to the displaying apparatus 112 so as to determine from the photographer whether or not the data amount reduction process is to be performed (STEP 306). That is, a scaled-down-image of the image file having the designation selected by the photographer is displayed so that the photographer can determine whether or not the data amount reduction process should be performed.

If the photographer orders the performance of the data amount reduction process by the operation part 124 (STEP 308, Yes), the system controller 122 makes the data amount reduction managing part 162 perform the data amount reduction process for the image file (STEP 310). Process contents of this step are substantially the same as the processes of STEPs 124-130. However, in this stage, a renewal process of the reduction rank list, corresponding to STEP 132 shown in FIG. 5, is not to be performed.

After this process is ended, the system controller 122 goes back to STEP 300. In the process of the next iteration of STEP 306, an image file whose reduction rank is later than the scaled-down-image file indicated last time is selected and its scaled-down-image is indicated.

If the photographer determines that recording medium 140 has a sufficient unused capacity based on the pieces applicable to be photographed, the photographer can order "end" at STEP 300. If "end" order is input (STEP 304, Yes), the system controller 12 makes the data amount reduction management part 162 perform a renewal process of the reduction rank list (STEP 312). This renewal process is substantially the same as STEP 132 shown in FIG. 5.

[Various Designation Performances]

Figure 8:
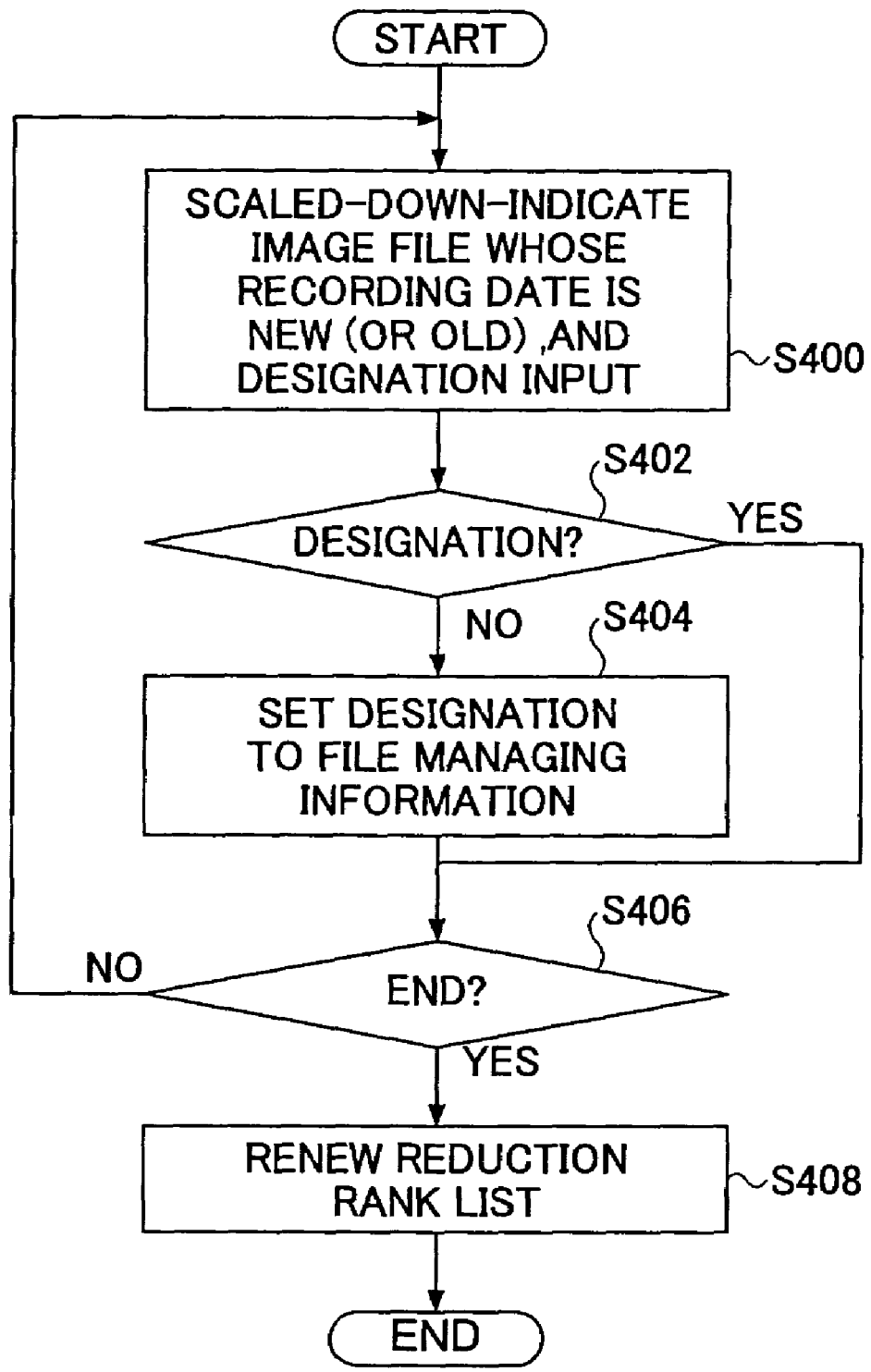
FIG. 8 is a flow chart for explaining an operation whereby various designations are performed on image data that are recorded.

As described above, it is possible to perform "designation of my favorite", "size change allowance designation", or "making-monochrome allowance designation" for the image file that has already been recorded at the time of just after photographing or at any timing. An example of the operation for the designation will be described with reference to a flow chart shown in FIG. 8.

If the photographer selects the operation mode by using the operation part 124, the system controller 122 refers to the file managing information and selects one image file not having "designation" from the side of a new recording date (or the side of an old recording date). The system controller 122 makes the file managing part 166 read out the selected image file and makes the image compression/elongation part 150 use the elongation process for code data so that an image having the lowest analysis degree level can be reconstructed.

The system controller 122 makes the image processor 110 provides a scaled-down-image to the displaying apparatus 112 so as to encourage a designation input from the photographer (STEP 400). In the case of a motion picture, for example, an image file of a first frame is selected and its image is scaled-down.

The photographer can select "designation of my favorite", "size change allowance designation", "making-monochrome allowance designation", "no-designation" or "end" by using the operation part 124.

In a case where "designation of my favorite", "size change allowance designation", or "making-monochrome allowance designation" is selected (STEP 402, Yes), the system controller 122 sets information mentioning its designation contents to the file managing information of the image file (STEP 404). In a case where the image file is a motion picture, information mentioning the same designation contents is set to the all of the frames.

The system controller 122 goes back to STEP 400. The system controller 122 selects one of the image files not having a designation and whose recording date is new (or old) following the image file selected the last time so as to provide its scale-down-image. The system controller 122 waits for a designation input by the photographer and performs a process corresponding to the designation input. Until "end" is input by the photographer, the substantially same processes are repeated. If the "end" is input by the photographer (STEP 406, Yes), the system controller 122 makes the data amount reduction management part 162 perform the renewal process of the reduction rank list (STEP 408) so as to end the operation.

In the above mentioned embodiment, as means for performing the data amount reduction process for an image file that has already been recorded, the code generation part 160 of the image compression/elongation part 150 is applied. Such means may be independent.

Furthermore, in the above mentioned embodiment, an image compression algorithm in conformity to JPEG2000 is applied as the image compression algorithm. Hence, the data amount reduction process for the recorded image file is performed by deleting a part of the compressed code data. This method has an advantage in that there is little deterioration of the image quality as compared with a method by which the code data are elongated and then recompressed. However, it is possible to apply a method by which the data reduction is performed with recompression. This example is included in the present invention.

Furthermore, all or a part of the system controller 122, the image compression/elongation part 150, the file managing part 166 or the data amount reduction management part 162 may be performed by a single or plural processor(s) such as CPU(s) or MPU(s) with software. In other word, a process described with reference to respective flow charts of FIGS. 4-8 may be performed by software. The substantially same processes may be performed on an all-purpose processor such as a computer by software. Furthermore, a program for the above mentioned performance and various kinds of recording media in which the program is recorded are included in the present invention.

Thus, as described above, according to the present invention, in the electronic camera apparatus and other image recording apparatuses, the recorded image data are properly selected and the data amount reduction process is performed, so that the unused capacity of the recording medium can be secured and the user can obtain high satisfaction. Furthermore, since an operation for the data amount reduction including the selection of the image data can be automated, it is possible to improve the easiness of use and usefulness of an image recording apparatus such as an electronic camera apparatus. Furthermore, even if there is not sufficient margin of the unused capacity of the recording medium, it is possible to avoid an interruption of taking of the motion pictures due to the lack of the unused capacity.

The present invention is not limited to these embodiments, but variations and modifications may be made without departing from the scope of the present invention.

This patent application is based on Japanese priority patent application No. 2001-213560 filed on Jul. 23, 2002, the entire contents of which are hereby incorporated by reference.

What is claimed is:

1. An image recording apparatus, comprising:
    means for recording image data in a recording medium;
    means for obtaining information for determining a data amount reduction remaining force of image data recorded in the recording medium;
    means for selecting image data determined to have a large data amount reduction remaining force based on the information obtained by the means for obtaining information, with a priority; and
    means for performing a data amount reduction process against the image data selected by the means for selecting,
    wherein the image data are compressed by an image compression algorithm, and
    image data having a large value of a ratio of an amount of present code to an amount of lossless code are determined as image data having the large data amount reduction remaining force.

2. The image recording apparatus, as claimed in claim 1, wherein the amount of present code and the amount of the lossless code are amounts to which added visual weight is given for every sub-band.

3. The image recording apparatus, as claimed in claim 1, wherein in image data of motion pictures, image data of a motion picture having a larger average value or maximum value of the ratio of the amount of present code to the amount of lossless code are determined as image data having the large data amount reduction remaining force.

4. The image recording apparatus, as claimed in claim 1, further comprising:
    picture means for photographing a subject to be photographed and inputting the image data; and
    image compression means for compressing the image data input by the picture means,
    wherein the image data compressed by the image compression means are recorded in the recording medium.

5. An image recording apparatus, comprising:
    means for recording image data in a recording medium;
    means for obtaining information for determining a data amount reduction remaining force of image data recorded in the recording medium;
    means for selecting image data determined to have a large data amount reduction remaining force based on the information obtained by the means for obtaining information, with a priority; and
    means for performing a data amount reduction process against the image data selected by the means for selecting,
    wherein the image data are compressed by an image compression algorithm in conformity to a bitplane coding scheme, and image data having a large value of a ratio of an amount of present code to a total number of non-zero bitplanes are determined as image data having the large data amount reduction remaining force.

6. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority; and
means for performing a data amount reduction process against the image data selected by the means for selecting,
wherein the image data are compressed by a bitplane coding, and image data having a small value of sum of truncated bitplanes or sum of truncated subbitplanes are determined as image data having the large data amount reduction remaining force.

7. The image recording apparatus, as claimed in claim 6, wherein the value of sum of truncated bitplanes or sum of truncated subbitplanes is determined considering the quantization step sizes.

8. The image recording apparatus, as claimed in claim 6, wherein the value of sum of truncated bitplanes or sum of truncated subbitplanes is determined considering the subband gains.

9. The image recording apparatus, as claimed in claim 6, wherein the value of sum of truncated bitplanes or sum of truncated subbitplanes is determined considering the inverse component transform gains.

10. The image recording apparatus, as claimed in claim 6, wherein the value of sum of truncated bitplanes or sum of truncated subbitplanes is determined considering the human visual character.

11. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority; and
means for performing a data amount reduction process against the image data selected by the means for selecting,
wherein image data having a small value of sum of quantization errors are determined as image data having the large data amount reduction remaining force.

12. The image recording apparatus, as claimed in claim 11, wherein the image data are compressed by a bitplane coding, and the value of sum of quantization errors is determined considering the truncated bitplanes or truncated subbitplanes and quantization step sizes.

13. The image recording apparatus, as claimed in claim 11, wherein the value of sum of quantization errors is determined considering the subband gains.

14. The image recording apparatus, as claimed in claim 11, wherein the value of sum of quantization errors is determined considering the inverse component transform gains.

15. The image recording apparatus, as claimed in claim 11, wherein the value of sum of quantization errors is determined considering the human visual character.

16. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority; and
means for performing a data amount reduction process against the image data selected by the means for selecting,
wherein the image data are compressed by an image compression algorithm in conformity to a bitplane coding scheme, and
image data having a small total number of non-zero bitplanes are determined as image data having the large data amount reduction remaining force.

17. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority; and
means for performing a data amount reduction process against the image data selected by the means for selecting,
wherein image data having a small number of times of using an application of the data amount reduction process are determined as image data having the large data amount reduction remaining force.

18. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority; and
means for performing a data amount reduction process against the image data selected by the means for selecting,
wherein it is determined that the data amount reduction remaining force of image data of a motion picture is greater than the data amount reduction remaining force of image data of a still picture.

19. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority; and
means for performing a data amount reduction process against the image data selected by the means for selecting, wherein it is determined that the data amount reduction remaining force of the image data having a designation of the data amount reduction process is greater than the data amount reduction remaining force of the image data not having the designation of the data amount reduction process.

20. An image recording apparatus, comprising:
means for recording image data in a recording medium;
means for obtaining information for determining a data amount reduction remaining force of image data recorded in the recording medium;
means for selecting image data determined to have a large data amount reduction remaining force based on the information obtained by the means for obtaining information, with a priority;
means for performing a data amount reduction process against the image data selected by the means for selecting;
picture means for photographing a subject to be photographed and inputting the image data;
image compression means for compressing the image data input by the picture means;
means for detecting a lack of unused capacity of the recording medium; and
means for controlling the data amount reduction process for the recorded image data in a case where the lack of unused capacity is detected by the means for detecting,
wherein the image data compressed by the image compression means are recorded in the recording medium.

21. The image recording apparatus as claimed in claim 20, further comprising:
means for controlling the rising of a compression ratio of the image compression means when the lack of unused capacity of the recording medium is detected during a period in which the image data of a motion picture is input by the picture means.

22. An image data selection method for selecting image data on which a data amount reduction process is performed from image data recorded in a recording medium, comprising the steps of:
a) obtaining information for determining a data amount reduction remaining force of image data; and
b) selecting image data determined to have a large data amount reduction remaining force, based on the information obtained in the step a), by a criterion, with a priority,
wherein the image data are compressed by an image compression algorithm and recorded in the recording medium, and
image data having a large value of a ratio of an amount of present code to an amount of lossless code are determined as image data having the large data amount reduction remaining force.

23. The image data selection method as claimed in claim 22,
wherein the amount of present code and the amount of the lossless code are amounts to which added visual weight is given for every sub-band.

24. The image data selection method as claimed in claim 22,
wherein a criterion for determining the data amount reduction remaining force can be selected from a plurality of the criteria.

25. An image data selection method for selecting image data on which a data amount reduction process is performed from image data recorded in a recording medium, comprising the steps of:

a) obtaining information for determining a data amount reduction remaining force of image data; and
b) selecting image data determined to have a large data amount reduction remaining force, based on the information obtained in the step a), by a criterion, with a priority,
wherein the image data are compressed by an image compression algorithm in conformity to a bitplane coding scheme and recorded in the recording medium, and
image data having a large value of a ratio of an amount of present code to a total number of non-zero bitplanes are determined as image data having the large data amount reduction remaining force.

26. An image data selection method for selecting image data on which a data amount reduction process is performed from image data recorded in a recording medium, comprising the steps of:
a) obtaining information for determining a data amount reduction remaining force of image data; and
b) selecting image data determined to have a large data amount reduction remaining force, based on the information obtained in the step a), by a criterion, with a priority,
wherein the image data are compressed by an image compression algorithm in conformity to a bitplane coding scheme and recorded in the recording medium, and
image data having a small total number of non-zero bitplanes are determined as image data having the large data amount reduction remaining force.

27. A computer readable medium encoded with computer executable instructions that cause a computer to implement a method of selecting image data to which a data amount reduction process is performed from image data recorded in the computer readable medium, the method comprising:
a) obtaining information for determining a data amount reduction remaining force of image data; and
b) selecting image data determined to have a large data amount reduction remaining force, based on the information obtained in the step a), by a criterion, with a priority, wherein
the image data are compressed by an image compression algorithm, and
image data having a large value of a ratio of an amount of present code to an amount of lossless code are determined as image data having the large data amount reduction force.

28. An image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein the image data are compressed by an image compression algorithm, and
image data having a large value of a ratio of an amount of present code to an amount of lossless code are determined as image data having the large data amount reduction remaining force.

29. The image recording method, as claimed in claim 28, wherein the amount of present code and the amount of the lossless code are amounts to which added visual weight is given for every sub-band.

30. The image recording method, as claimed in claim 28, wherein in image data of motion pictures, image data of a motion picture having a larger average value or maximum value of the ratio of the amount of present code to the amount of lossless code are determined as image data having the large data amount reduction remaining force.

31. The image recording method, as claimed in claim 28, further comprising:
photographing a subject to be photographed and inputting the image data; and
compressing the image data input by the photographing step,
wherein the image data compressed by the compressing step are recorded in the recording medium.

32. An image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein the image data are compressed by an image compression algorithm in conformity to a bitplane coding scheme, and
image data having a large value of an amount of present code to a total number of non-zero bitplanes are determined as image data having the large data amount reduction remaining force.

33. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein the image data are compressed by a bitplane coding, and image data having a small value of sum of truncated bitplanes or sum of truncated subbitplanes are determined as image data having the large data amount reduction remaining force.

34. The image recording method, as claimed in claim 33, wherein the value of sum of truncated bitplanes or sum of truncated subbitplanes is determined considering the quantization step sizes.

35. The image recording method, as claimed in claim 33, wherein the value of sum of truncated bitplanes or sum of truncated subbitplanes is determined considering the subband gains.

36. The image recording method, as claimed in claim 33, wherein the value of sum of truncated bitplanes or sum of truncated subbitplanes is determined considering the inverse component transform gains.

37. The image recording method, as claimed in claim 33, wherein the value of sum of truncated bitplanes or sum of truncated subbitplanes is determined considering the human visual character.

38. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein image data having a small value of sum of quantization errors are determined as image data having the large data amount reduction remaining force.

39. The image recording method, as claimed in claim 38, wherein the image data are compressed by a bitplane coding, and the value of sum of quantization errors is determined considering the truncated bitplanes or truncated subbitplanes and quantization step sizes.

40. The image recording method, as claimed in claim 38, wherein the value of sum of quantization errors is determined considering the subband gains.

41. The image recording method, as claimed in claim 38, wherein the value of sum of quantization errors is determined considering the inverse component transform gains.

42. The image recording method, as claimed in claim 38, wherein the value of sum of quantization errors is determined considering the human visual character.

43. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein the image data are compressed by an image compression algorithm in conformity to a bitplane coding scheme, and
image data having a small total number of non-zero bitplanes are determined as image data having the large data amount reduction remaining force.

44. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein image data having a small number of times of using an application of the data amount reduction process are determined as image data having the large data amount reduction remaining force.

45. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein it is determined that the data amount reduction remaining force of image data of a motion picture is greater than the data amount reduction remaining force of image data of a still picture.

46. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step,
wherein it is determined that the data amount reduction remaining force of the image data having a designation of the data amount reduction process is greater than the data amount reduction remaining force of the image data not having the designation of the data amount reduction process.

47. The image recording method, comprising:
recording image data in a recording medium;
obtaining information for determining a data amount reduction remaining force of image data recorded in the recording medium;
selecting image data determined to have a large data amount reduction remaining force based on the information obtained by the obtaining step, with a priority; and
performing a data amount reduction process against the image data selected by the selecting step;
photographing a subject to be photographed and inputting the image data;
compressing the image data input by the photographing step;
detecting a lack of unused capacity of the recording medium; and
controlling the data amount reduction process for the recorded image data in a case where the lack of unused capacity is detected by the detecting step,
wherein the image data compressed by the compressing step are recorded in the recording medium.

48. The image recording method as claimed in claim 47, further comprising:
controlling the rising of a compression ratio of the compressing step when the lack of unused capacity of the recording medium is detected during a period in which the image data of a motion picture is input by the photographing step.

* * * * *